(12) United States Patent
Dettloff

(10) Patent No.: US 6,570,541 B2
(45) Date of Patent: *May 27, 2003

(54) SYSTEMS AND METHODS FOR WIRELESSLY PROJECTING POWER USING MULTIPLE IN-PHASE CURRENT LOOPS

(75) Inventor: Wayne D. Dettloff, Cary, NC (US)

(73) Assignee: db Tag, Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/732,397

(22) Filed: Dec. 7, 2000

(65) Prior Publication Data

US 2001/0000960 A1 May 10, 2001

Related U.S. Application Data

(63) Continuation-in-part of application No. 09/312,577, filed on May 14, 1999.
(60) Provisional application No. 60/169,726, filed on Dec. 8, 1999, and provisional application No. 60/085,788, filed on May 18, 1998.

(51) Int. Cl.[7] .............................................. H01Q 11/12
(52) U.S. Cl. ....................... 343/742; 343/867; 343/895
(58) Field of Search ................................. 343/742, 741, 343/866, 867, 895; H01Q 11/12

(56) References Cited

U.S. PATENT DOCUMENTS

| 2,618,746 A | 11/1952 | Pauch | 250/33.67 |
| 3,925,784 A | 12/1975 | Phelan | 343/754 |

(List continued on next page.)

FOREIGN PATENT DOCUMENTS

| EP | 0 645 840 A1 | 3/1995 | |
| EP | 645840 A1 * | 3/1995 | H01Q/7/04 |
| EP | 0 693 733 A1 | 1/1996 | |
| WO | WO 97/38404 | 10/1997 | |
| WO | WO 00/26989 A1 | 5/2000 | |

OTHER PUBLICATIONS

*Evaluating Compliance with FCC Guidelines for Human Exposure to Radiofrequency Electromagnetic Fields*, Federal Communications Commission Office of Engineering & Technology, OET Bulletin 65, Edition 97–01, Aug. 1997, 79 pp.

Hawkes, *AIM RFID Tag Systems, Singing in Concert*, http://www.aimglobal.org/techinfo/rfid/rfidtags.html, 7 pp.

Primary Examiner—Hoanganh Le
(74) Attorney, Agent, or Firm—Myers Bigel Sibley & Sajovec

(57) ABSTRACT

First and second spaced apart in-phase current loops at least partially overlap in the axial direction. The first and second current loops may be first and second arrays of in-phase current loops that are spaced apart and at least partially overlap in the axial direction. First and second arrays of arrays also may be provided that are spaced apart from one another and that at least partially overlap in the axial direction. Desirably high mid-field strength may be provided without violating guidelines for far field radiation in the axial direction or in the plane of the loops. A third array of in-phase current loops, an array of third in-phase current loops and/or an array of arrays of third in-phase current loops also may be provided that spaced apart from and at least partially overlapping the second loops in the axial direction, opposite the first loops. Third and fourth arrays of in-phase current loops also may be provided that are spaced apart from one another, at least partially overlap one another in the axial direction, and have different orientation than the first and second current loops, to reduce and preferably minimize nulls in the near field and mid field. A receive antenna also may be provided between the overlapping portions of the first and second current loops. By providing a receive antenna at this position, the effects of the fields that are produced by the current loops on the receive antenna may be reduced and preferably minimized.

44 Claims, 27 Drawing Sheets

U.S. PATENT DOCUMENTS

| | | | |
|---|---|---|---|
| 4,012,742 A | 3/1977 | Dempsey | 343/742 |
| 4,135,184 A * | 1/1979 | Pruzick | 343/572 |
| 4,243,980 A | 1/1981 | Lichtblau | 340/572 |
| 4,373,163 A | 2/1983 | Vandebult | 343/842 |
| 4,872,018 A | 10/1989 | Feltz et al. | 343/742 |
| 5,223,849 A | 6/1993 | Kasevich et al. | 343/895 |
| 5,339,073 A | 8/1994 | Dodd et al. | 340/825.31 |
| 5,402,134 A | 3/1995 | Miller et al. | 343/742 |
| 5,523,749 A | 6/1996 | Cole et al. | |
| 5,550,547 A | 8/1996 | Chan et al. | 342/42 |
| 5,583,850 A | 12/1996 | Snodgrass et al. | 370/342 |
| 5,627,544 A | 5/1997 | Snodgrass et al. | 342/42 |
| 5,793,324 A | 8/1998 | Aslanidis et al. | 342/51 |
| 5,856,788 A | 1/1999 | Walter et al. | 340/825.54 |
| 5,877,728 A | 3/1999 | Wu et al. | 343/742 |
| 5,963,173 A | 10/1999 | Lian et al. | 343/742 |
| 6,016,131 A | 1/2000 | Sato et al. | 343/895 |
| 6,018,327 A | 1/2000 | Nakano et al. | 343/895 |
| 6,025,807 A * | 2/2000 | Jon et al. | 343/742 |
| 6,081,238 A | 6/2000 | Alicot | 343/742 |
| 6,259,413 B1 * | 7/2001 | Schmidt et al. | 343/742 |
| 6,344,824 B1 * | 2/2002 | Takasugi et al. | 343/700 MS |

* cited by examiner

Array 1    Array 2

Far Field Cancellation Antenna

Array

Far Field Cancellation Antenna

SYSTEMS AND METHODS FOR WIRELESSLY PROJECTING POWER USING MULTIPLE IN-PHASE CURRENT LOOPS

CROSS REFERENCE TO RELATED APPLICATION

This application claims the benefit of provisional application Serial No. 60/169,726, filed Dec. 8, 1999, entitled Systems and Methods for Wirelessly Projecting Power Using Multiple In-Phase Current Loops, and is a Continuation-in-Part of application Ser. No. 09/312,577, filed May 14, 1999, entitled Systems And Methods For Wirelessly Projecting Power Using In-Phase Current Loops And For Identifying Radio Frequency Identification Tags That Are Simultaneously Interrogated (the "parent application"), which itself claims the benefit of provisional Application Serial No. 60/085,788, filed May 18, 1998, entitled Radio Frequency Identification System.

FIELD OF THE INVENTION

This invention relates to systems and methods for wirelessly projecting power and more particularly to systems and methods for wirelessly projecting power to microelectronic devices.

BACKGROUND OF THE INVENTION

Wireless powering of microelectronic devices is used, for example, for wireless Radio Frequency (RF) powering of Radio Frequency Identification (RFID) tags. RFID tags are used in the Automatic Data Collection (ADC) industry. In particular, printed bar codes are now widely used in the ADC industry. Unfortunately, bar codes may require line of sight reading, may hold limited amounts of information, may need to be read one at a time, may be subject to defacing and/or counterfeiting and may only provide fixed information. In contrast, RFID tags need not require line of sight reading, can hold large quantities of information, can have high transfer data rates, can be read in groups, can be more reliable and more difficult to destroy and/or counterfeit and can update stored information.

RFID tags generally may be classified into battery powered (active) RFID tags and RF powered (passive) tags. Compared to passive tags, active tags may be more expensive, may have a defined shelf life, may deplete with operation, may have potential disposability problems, may be physically larger and may be environmentally constrained due to the presence of a battery thereon. In sharp contrast, passive tags can be less expensive, can have an unlimited shelf life without depletion, can be relatively safe to dispose, can be relatively compact and can withstand harsher operating environments.

Notwithstanding these potential advantages, a major factor that may limit the availability of passive RFID tags is the ability to wirelessly project sufficient power to power the RFID tag.

In particular, RF communication among electronic devices currently is used across the RF spectrum. For example, cellular radiotelephones are widely used. In the United States, the Federal Communications Commission (FCC) regulates usage of electromagnetic radiation.

Unfortunately, the amount of power that is used to operate electronics may be orders of magnitude more than is used to exchange information. Accordingly, notwithstanding the advent of low power microelectronic devices, the ability to transmit enough power to be extracted by a remote microelectronic device may be difficult. In wirelessly projecting power to wirelessly power microelectronic devices, the biggest constraint may be the government regulations concerning permissible RF field strength.

Electromagnetic field emanation from an antenna classically is categorized as "near field" and "far field." Generally, electronic components that carry RF currents or voltages produce both types of fields. However, the relative amount of each field may vary greatly.

From an RF energy standpoint, near field generally refers to RF energy that is stored in the immediate vicinity of the component and that is recovered at a later time in the alternating RF current cycle. An ideal inductor is a perfect near field only device. Far field generally refers to the energy that radiates or propagates from a component as an electromagnetic wave. Thus, a real world inductor may produce some far field radiation. Conversely, an ideal dipole antenna produces no near field components but produces significant far field radiation. Real world dipole antennas may produce some near field components but generate large amounts of far field radiation.

Thus, the far field is the component of energy that permanently leaves an antenna or any other component, radiating or propagating into the environment as an electromagnetic wave. Conversely, in each cycle, a near field is created and the energy associated with the near field is stored in the space around the antenna. As the near field collapses, the energy is transferred back onto the antenna and drive circuitry.

It will be understood that the terms "near field" and "far field" classically also may be defined relative to the wavelength of the energy under consideration. As used herein, far field denotes energy at distances greater than about one wavelength, for example, greater than about 22 meters at 13.56 MHz and greater than about 31.6 cm at 950 MHz. Conversely, near field refers to energy that is less than about one wavelength in distance. For practical purposes, near field generally may be considered to be a fraction of a wavelength, while far field may generally be considered to be multiple wavelengths so that there may be an order-of-magnitude difference therebetween.

Near field and far field also may be distinguished by the drop-off of power from the antenna. Power in the far field generally drops off from a source antenna without gain as a function of $1/(distance)^2$. In contrast, power in the near field generally may exhibit a more complex relationship. At distances that are far less than one wavelength, the individual current carrying elements of the antenna may produce a near field that decreases, remains constant or may even increase with distance. Moreover, at distances that approach one wavelength, power generally drops off much quicker with distance compared to the far field, with some components dropping off as fast as $1/(distance)^8$, others closer to $1/(distance)^4$.

Antennas generally are designed to communicate over great distances. Accordingly, antennas generally are designed to optimize the far field for a particular application. Accordingly, FCC regulations also generally are written for far field radiation. For example, radiation typically is measured based on FCC standards at a distance greater than one wavelength because it is assumed that near field energy is greatly reduced at that distance. However, there also are FCC guidelines that relate to maximum exposures to electromagnetic radiation that can impact near field intensity limits.

For purposes of wirelessly projecting power to wirelessly power microelectronic devices, it would be desirable to increase the near field component of energy without increasing the far field component of energy sufficiently to violate FCC regulations. Preferably, the near field component also is not increased to the point where maximum exposure as stated by the FCC guidelines occurs too quickly. By increasing the near field component of energy, the microelectronic devices may be powered by the field that is stored in the space around the radiator. By not increasing the far field, the energy that propagates outward and that is not reclaimed may be reduced, and violation of government regulations that govern far field energy may be prevented. Unfortunately, when the near field is increased in order to extend the range at which power may be projected to wirelessly power microelectronic devices, the far field also may increase, thereby increasing the likelihood of regulatory violations.

SUMMARY OF THE INVENTION

The parent application provides an array of in-phase current loops that are disposed adjacent to one another to define a surface and to define a virtual current loop at a periphery of the surface that produces a same direction virtual current while current in adjacent portions of adjacent current loops flows in opposite directions, to thereby wirelessly project power from the surface. As described in the parent application, the array of in-phase current loops that are disposed adjacent to one another to define a surface and to define a virtual current loop at a periphery of the surface that produces a same direction virtual current while current in adjacent portions of adjacent current loops flows in opposite directions, can provide acceptable power to RFID tags, while reducing the risk of violating regulatory constraints.

It will be understood that, as used herein, the terms "in-phase", "same direction", "opposite direction" and "out-of-phase" refer to relationships at a given point in time. In particular, since alternating currents are used, that vary over time, the terms "in-phase", "same direction", "opposite direction" and "out-of-phase" refer to instantaneous current relationships. Moreover, it also will be understood that the terms "in-phase", "same direction", "opposite direction" and "out-of-phase" refer to current loops that are substantially in phase and virtual currents that are substantially in the same direction or substantially in opposite directions or out-of-phase. For example, current loops that are within ±20° of one another, more preferably ±10° of one another and most preferably of identical phase may be considered "in-phase." Virtual currents that are within ±20° of the same direction, more preferably within ±10° of the same direction and most preferably identically in the same direction may be considered to be in the "same direction." Finally, current loops or currents that are within 180°±20° of one another, more preferably 180°±10° of one another and most preferably 180° out-of-phase with one another may be regarded as being in the "opposite direction" or "out-of-phase."

Without being bound by any theory of operation, the parent application noted that the invention may be explained by dividing the classical near field as described above, into a "close-in near field" and a "mid field". The close-in near field refers to RF energy that is stored in the immediate vicinity an antenna, up to a distance of about the dimension of the antenna, such as the length of a dipole or the diameter of a loop. The mid field refers to RF energy that extends beyond the distance of about the dimension of the antenna to a distance of about one wavelength. Thus, for example, for a ten-inch diameter loop antenna that is radiating at 13.56 MHz, the close-in near field may extend from the plane of the loop to a distance of about ten inches, the mid field may extend from a distance of between about ten inches to about 22 meters and the far field may extend to distances that are greater than about 22 meters. It will be understood, however that since both the close-in near field and the mid field are components of the near field, they both comprise RF energy that is stored and recovered in the alternating RF current cycle.

As described in the parent application, an array of in-phase current loops that are disposed adjacent to one another to define a surface and to define a virtual current loop at a periphery of the surface that produces a same direction virtual current while current in adjacent portions of adjacent current loops flows in opposite directions, can reduce far field radiation so that the likelihood of violations of government regulations can be reduced. Moreover, by reducing far field radiation, the current in the array of in-phase current loops that are disposed adjacent to one another to define a surface and to define a virtual current loop at a periphery of the surface that produces a same direction virtual current with current in adjacent portions of adjacent current loops flowing in opposite directions, can be increased to thereby allow an increase in mid field components. Sufficient mid field components to power RFID tags thereby may be provided, without violating government regulations concerning far field radiation.

In one preferred embodiment in the parent application, the array of in-phase current loops comprises an array of at least three wedge-shaped current loops, each having an outer portion and a pair of sides. The at least three wedge-shaped current loops are disposed adjacent to one another to define a surface such that the virtual current loop defined by the outer portions flow in same directions and current in adjacent sides of adjacent current loops flow in opposite directions. The wedge-shaped current loops may be identical or mirror imaged. Two wedge-shaped current loops also may be provided, wherein each wedge is semicircle-shaped.

In another embodiment, the array of in-phase current loops comprises an array of at least two polygonal current loops, such as hexagonal current loops, each having a plurality of sides. The at least two polygonal current loops are disposed adjacent to one another to define a surface and a virtual current loop at the periphery of the surface that produces a same direction virtual current, with current in adjacent portions of adjacent current loops flowing in opposite directions. Stated differently currents in the sides of the at least two polygonal current loops that comprise the outer boundary are in-phase and currents in adjacent sides of adjacent current loops are out-of-phase. In yet another embodiment, the current loops may be circular or elliptical in shape.

In all of the above-described embodiments, the surface preferably is a planar surface. However, non-planar surfaces such as spheroidal surfaces also may be used. The surface may be a physical surface in which the array of in-phase current loops are mounted or may be a virtual surface defined by the array of in-phase current loops. Each of the current loops may be a spiral current loop, a concentric current loop and/or a stacked current loop. The length of each current loop preferably is less than a quarter wavelength.

In a preferred embodiment of the parent application, a driver drives the array of current loops at 13.56 MHz to thereby wirelessly project power. The frequency of 13.56 MHz preferably is used because the FCC allows relatively large amounts of field strength at this frequency. In particular, in the range of 13.56 MHz±7 KHz, FCC regulations allow 10,000 μV/m, whereas immediately outside that range only 30 μV/m may be allowed. However, other frequencies also may be used in the United States and in other countries.

The parent application also notes that in order to allow further reduction of the far field electromagnetic waves and further increases in current to provide additional mid field electromagnetic field strength, a plurality of arrays of in-phase current loops may be provided. The multiple arrays of in-phase current loops are disposed adjacent to one another to define a surface. Each array of in-phase current loops may be configured as was described above.

In a preferred embodiment that uses multiple arrays of in-phase current loops, the virtual current loops of adjacent arrays of in-phase current loops produce different phase virtual currents from one another. Specifically, four arrays of in-phase current loops may be provided that are arranged in two rows and two columns, such that the virtual current loops in the arrays in each row and each column are of opposite phase. In another embodiment, the virtual currents in the arrays in each row and each column are approximately 90° out-of-phase from one another. The two rows and columns may be orthogonal or non-orthogonal. Preferably, the two rows and two columns are obliquely arranged relative to the horizontal so that a tag passing across the plurality of arrays in the horizontal direction will encounter varying fields to thereby increase the likelihood of receiving sufficient power.

In another embodiment, six arrays of in-phase current loops may be provided that are arranged in four rows and two columns. In the first row, the phases of the virtual currents of the two arrays differ by approximately 60°. In the second row, the virtual currents of the two arrays flow in same directions, and in the third row, the phases of the virtual currents of the two arrays differ by approximately 60°. Viewed along the first column, the phases of the virtual currents are approximately 0°, 120° and 60° and along the second column the phases of the virtual currents are approximately 60°, 120° and 0°.

In another embodiment, a plurality of arrays of in-phase current loops are arranged in a circle, such that the virtual currents in adjacent arrays in the circle are of opposite phase. Alternatively, the phases may differ by approximately 360°/n, where n is the number of arrays of in-phase current loops that are arranged in a circle. The plurality of in-phase current loops also may be arranged in an elliptical shape or a polygonal shape. They may be overlapping or spaced apart.

Accordingly, reduced far field radiation may be produced by systems and methods according to the present invention. By producing reduced far field radiation, the current in the current loops may be increased to thereby increase the mid field strength without violating government regulations for far field radiation. In order to reduce the close-in near field without significantly changing the mid field or far field, the outer portions of the wedge-shaped current loops also can be implemented as multiple loops that are spatially separated, while the sides of the wedges can remain the same. Thus, the close-in near field may be reduced so that exposure time under FCC guidelines can be increased.

The systems and methods that were described above may produce undesirably large far field radiation in the plane of the current loops, normal to the axial direction. In order to allow reduction of far field radiation in the plane, first and second spaced apart in-phase current loops may be provided that at least partially overlap in the axial direction. The current loops themselves may be actual current loops and/or any of the virtual current loops that were described above. For example, first and second arrays of in-phase virtual current loops as described above may be provided, wherein the first and second arrays are spaced apart and at least partially overlap in the axial direction. First and second arrays of arrays also may be provided, that are spaced apart from one another and that at least partially overlap in the axial direction. Desirably high mid field strength may be provided without violating guidelines for far field radiation in the axial direction or in the plane of the loops. A third array of in-phase current loops, an array of third in-phase current loops and/or an array of arrays of third in-plane current loops also may be provided that is spaced apart from and at least partially axially overlaps the second loops, opposite the first loops.

More specifically, power may be wirelessly projected by providing a first array of in-phase current loops that are disposed adjacent to one another to define a first surface and to define a first virtual current loop at a periphery of the first surface that produces a same first direction virtual current while current in adjacent portions of adjacent current loops flows in opposite directions. The first surface includes a center, wherein two points on the periphery of the first surface and the center define a plane and an axial direction that is normal to the plane. A second array of in-phase current loops also may be provided that are disposed adjacent to one another to define a second surface and to define a second virtual current loop at a periphery of the second surface that produces a same second direction virtual current that is opposite the same first direction virtual current, while current in adjacent portions of adjacent current loops flows in opposite directions. The first surface is spaced apart from and at least partially overlaps the second surface in the axial direction. At least one of the first and second arrays may comprise wedge shaped current loops, polygonal current loops, spiral current loops, concentric current loops and/or stacked current loops as was already described. The first and second arrays of in-phase current loops may be of the same size. The first surface preferably is spaced apart from and completely overlaps the second surface in the axial direction.

According to another aspect of the present invention, a receive antenna is provided between the overlapping portions of the first and second surfaces. Preferably, the receive antenna is midway between the overlapping portions of the first and second surfaces and more preferably extends parallel to the overlapping portion of the first surface. By providing a receive antenna at this position, the effects of the fields that are produced by the arrays of current loops on the receive antenna may be reduced and preferably minimized.

A third array of in-phase current loops also may be provided, that are disposed adjacent to one another to define a third surface and to define a third virtual current loop at a periphery of the third surface that produces a same first direction virtual current while current in adjacent portions of adjacent current loops flows in opposite directions. The third surface is spaced apart from the second surface, is opposite the first surface and at least partially overlaps the second surface in the axial direction.

According to another aspect, third and fourth arrays of in-phase current loops also may be provided. The third array of in-phase current loops are disposed adjacent to one another to define a third surface and to define a third virtual current loop at a periphery of the third surface that produces a same first direction virtual current while current in adjacent portions of adjacent current loops flows in opposite directions. The third surface includes a center, wherein two points on the periphery of the third surface and the center define a second plane and a second axial direction that is normal to the second plane and that is different from the first axial direction. A fourth array of in-phase current loops also may be provided that are disposed adjacent to one another to define a fourth surface and to define a fourth virtual current loop at the periphery of the fourth surface that produces a same second direction virtual current that is opposite the same first direction virtual current while current in adjacent portions of adjacent current loops flows in opposite directions. The fourth surface is spaced apart from and at least partially overlaps the third surface in the second axial direction. By providing third and fourth arrays of current loops that have different orientation than the first and second arrays of in-phase current loops, nulls in the near field and mid field may be reduced and preferably minimized.

Alternate embodiments of the present invention provide a plurality of first arrays of in-phase current loops and a plurality of second arrays of in-phase current loops wherein the plurality of first arrays of in-phase current loops define a first surface and the plurality of second arrays of in-phase current loops define a second surface, and wherein the first surface is spaced apart from and at least partially overlaps the second surface in the axial direction. As was already described, four arrays of current loops may be provided, for example in two rows and two columns and/or a circle of arrays of in-phase current loops may be provided. The individual arrays of in-phase current loops may be provided as was described above. A plurality of third and fourth arrays of in-phase current loops also may be provided as was described above to reduce nulls.

Finally, according to other embodiments, a first in-phase current loop is provided that defines a first surface and that produces a first direction current. The first surface includes a center, wherein two points on the periphery of the first surface and the center define a plane and an axial direction that is normal to the plane. A second in-phase current loop defines a second surface that produces a second direction current that is opposite the first direction current. The first surface is spaced apart from and at least partially overlaps the second surface in the axial direction. Preferably, the first surface completely overlaps the second surface in the axial direction. Third and fourth in-phase current loops also may be provided as was described above to reduce nulls.

Accordingly, multiple in-phase current loops may be used to wirelessly project power in the mid field without violating far field radiation guidelines in the axial direction or normal to the axial direction.

BRIEF DESCRIPTION OF THE DRAWINGS

FIGS. 40B-4D graphically illustrate simulations of electric field intensity at 30 meters, electric field azimuth pattern and magnetic field, respectively, for the two in-phase current loops of FIG. 40A;

DETAILED DESCRIPTION OF PREFERRED EMBODIMENTS

Figure 1A:
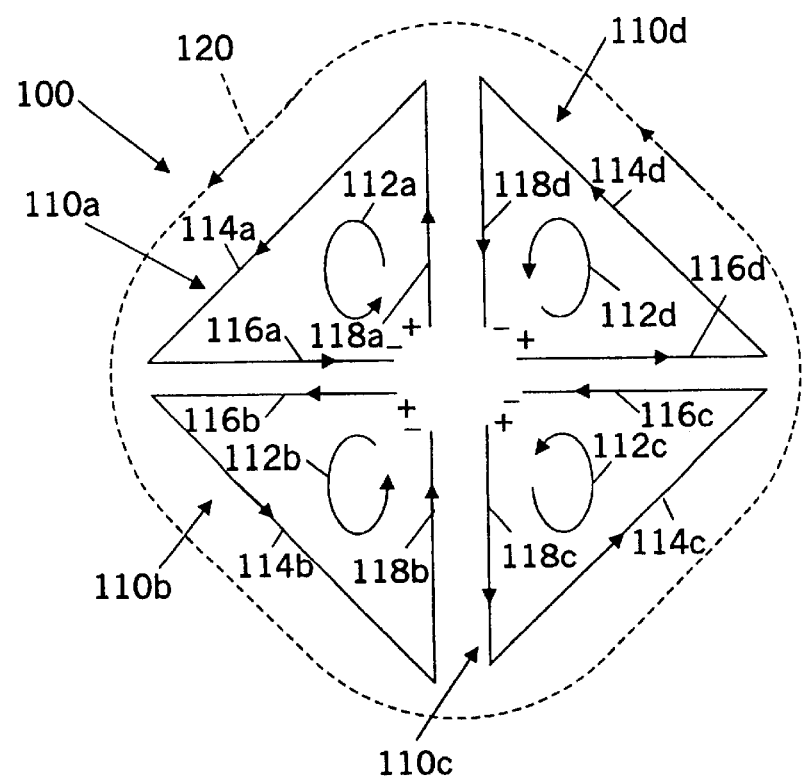
FIG. 1A is a schematic diagram of systems and methods for wirelessly projecting power according to the parent application.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the dimensions may be exaggerated for clarity. Like numbers refer to like elements throughout.

The present invention provides antenna configurations that can emphasize the mid field without producing undue amounts of close-in near field or far field. Thus, greater powering distances may be achieved that may not violate governmental regulations and/or guidelines. Accordingly, the present invention provides antenna configurations that can effectively project the mid field while simultaneously reducing at least some of the far field and distributing the close-in near field to reduce the peaks thereof. The mid field therefore can be extended without generating undue amounts of close-in near field or far field.

Existing RFID systems may use the far field to power the RFID tags. These systems may use high frequency ranges because the wavelength is short and the close-in near field and even the mid field is attenuated after a few centimeters. By using a higher frequency, physically smaller antennas may be used and faster operation and collimation of energy beams may be provided. However, by using the mid field, according to the present invention, at least two advantages may be provided. First, the FCC and other regulatory agency regulations generally are measured in the far field and are not violated by mid field radiation. Moreover, since the energy of the mid field may be recovered, except for those portions which are lost due to parasitic resistive loading and very low levels of radiated field each cycle, the overall power that is used to extend or project the field into the mid field may be reduced. This contrasts with the power of the far field which generally is lost to propagation. Thus, mid field use can provide portable or battery-powered applications.

Moreover, the use of the magnetic field rather than the electric field may have advantages. For example, the magnetic field lines form a loop, starting on one surface of the antenna and looping around to the other. Any loop or series of loops through which the flux lines penetrate can be used to extract power. Electric fields also may have more of an effect on the human body than magnetic fields. Accordingly, many of the newest standards may allow for higher exposure limits for magnetic fields. Finally, electric fields generally do not penetrate conductors whereas magnetic fields can penetrate non-ferrous materials such as aluminum and copper.

Unfortunately, there are problems that classically may be associated with using the near field. In particular, drop-off with distance generally is extremely fast. Moreover, generation of a strong near field component generally also produces a proportional far field component. Finally, the three-dimensional shape of the near field tends to have nulls as the field wraps around the current carrying wires.

The parent application described how these and other problems may be overcome by providing an array of in-phase current loops that are disposed adjacent to one another to define a surface and to define a virtual current loop at a periphery of the surface. The virtual current loop produces a same direction virtual current along the periphery while the current in adjacent portions of adjacent loops flows in opposite directions.

FIG. 1A is a schematic diagram of systems and methods for wirelessly projecting power according to the parent application. It will be understood that more complicated embodiments and more simple embodiments also may be provided as will be described in detail below.

Referring now to FIG. 1A, an array 100 of four wedge-shaped in-phase current loops 110a–110d are disposed adjacent to one another to define a surface in the plane of the antenna (corresponding to the plane of the paper of FIG. 1A) and to define a virtual current loop 120 at a periphery of the surface that produces a same direction virtual current. The in-phase nature of the current loops 110a–110d is indicated in three different ways in FIG. 1A. First, "+" and "−" signs are included for each current loop 110a–110d to indicate how the loops may be driven from a common voltage and/or current source. Second, arrows in each leg of each current loop indicate direction of current flow at a given point in time. Finally, an arrow 112a–112d inside each current loop indicates counter-clockwise in-phase current flow in each current loop 110a–110d at a given point in time.

Accordingly, the current that flows in the same direction at the outer legs 114a–114d of current loops 110a–110d produce the same direction virtual current 120. The outer legs need not be straight. They may be arced, rippled and or may comprise multiple straight segments. In contrast, current in adjacent portions 116a–116b, 118b–118c, 116c–116d and 118d–118a of adjacent current loops 110a–110d flows in opposite directions. It has been found, according to the parent application, that an array 100 of in-phase current loops 110 can reduce far field for approximately the same value of near field compared to a single current loop. Acceptable power to RFID tags thereby may be provided while reducing the risk of violating regulatory constraints.

Figure 1B:
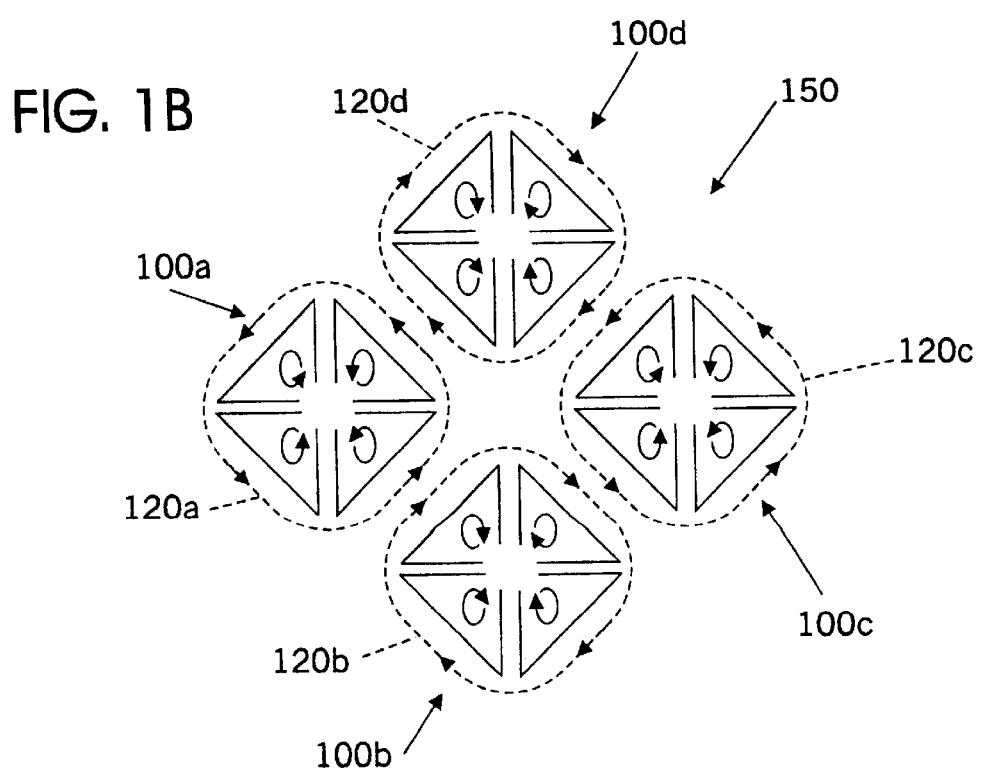
FIG. 1B illustrates another embodiment of systems and methods for wirelessly projecting power according to the parent application.

FIG. 1B illustrates another embodiment of systems and methods of the parent application that can provide additional reduction of far field and further increase of the mid field. As shown in FIG. 1B, the systems and methods 150 include a plurality of arrays 100a–100d of in-phase current loops. The arrays 100a–100d of in-phase current loops are disposed adjacent to one another to define a surface. As also shown in FIG. 1B, each array of in-phase current loops defines virtual currents 120a–120d such that virtual currents of at least some adjacent arrays of in-phase current loops are out-of-phase with one another. Thus, the virtual currents 120a and 120b are out-of-phase with one another, and the virtual currents 120a and 120c are in-phase. Each array of in-phase current loops 100a–100d can contain a structure such as was described in FIG. 1A and will not be described again.

The parent application preferably uses an electrically small spiral or loop antenna for a current loop 110, which may be an inefficient radiator or producer of a strong far field. This may be achieved by using loops or spirals that are electrically very short. Preferably, the loop or spiral is much less than one-quarter of a wavelength. FIGS. 2A–2E conceptually illustrate current loops 110 comprising a single loop, multiple loops, a two-turn spiral, a multi-turn spiral and concurrent loops, respectively. The length of each of the conductors is preferably much less than one-quarter of a wavelength to thereby provide an inefficient far field radiator.

Figure 2A:
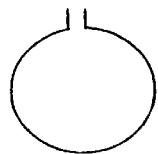
FIGS. 2A–2E conceptually illustrate various embodiments of current loops according to the parent application.
Figure 2B:
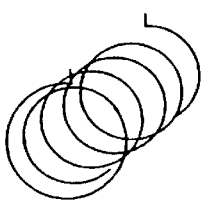
Figure 2C:
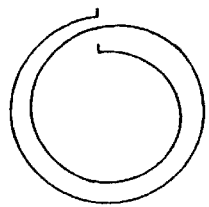
Figure 2D:
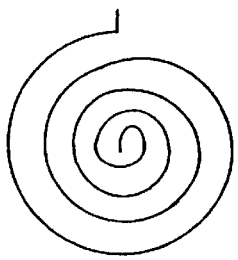
Figure 2E:
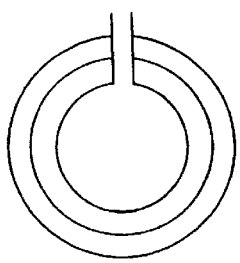

Spirals may be used to maximize the number of ampere turns in a planar environment and hence develop a strong mid field. FIGS. 2C, 2D and 2E illustrate that the strength of a magnetic field created by current flowing in a wire may be increased by increasing the current or the length of the wire in the loops or spirals. In a plane, as on a printed circuit board, the length also may be increased with more turns in the spiral.

Figure 3A:
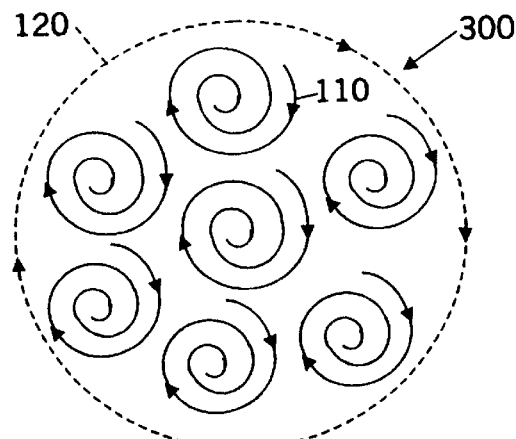
FIG. 3A illustrates an array of in-phase spiral current loops according to the parent application.

FIG. 3A illustrates another embodiment of systems and methods of the parent application. Instead of wedges to provide a virtual current, loops, spirals or polygons can be arranged such that adjacent current segments are out-of-phase and the periphery produces the in-phase virtual current loop. As shown in FIG. 3A at a point in time, all of the loop currents flow clockwise to produce a clockwise virtual current 120. As shown, where the loops are physically close, the currents of adjacent loops flow in opposite directions. The outer portions of the current loops are spatially separated to reduce the close-in near field without significantly effecting the mid field. Both the close-in near field and the mid field may be related to the size of the current loops and the number of ampere turns. Unfortunately, the far field may not be completely independent of these parameters either. However, as will be described below, by using multiple arrays of arrays of in-phase current loops, far field emissions can be reduced more than the reduction in the mid field projection.

Figure 3B:
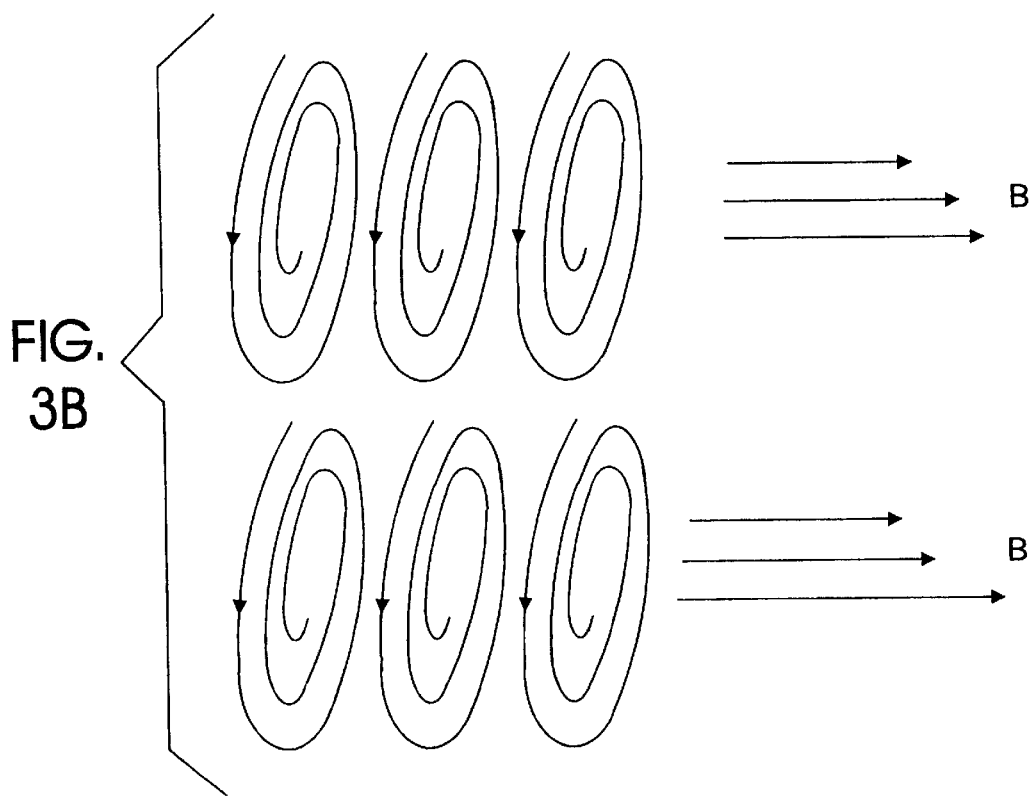
FIG. 3B illustrates an array of in-phase elongated spiral current loops according to the parent application.
Figure 3C:
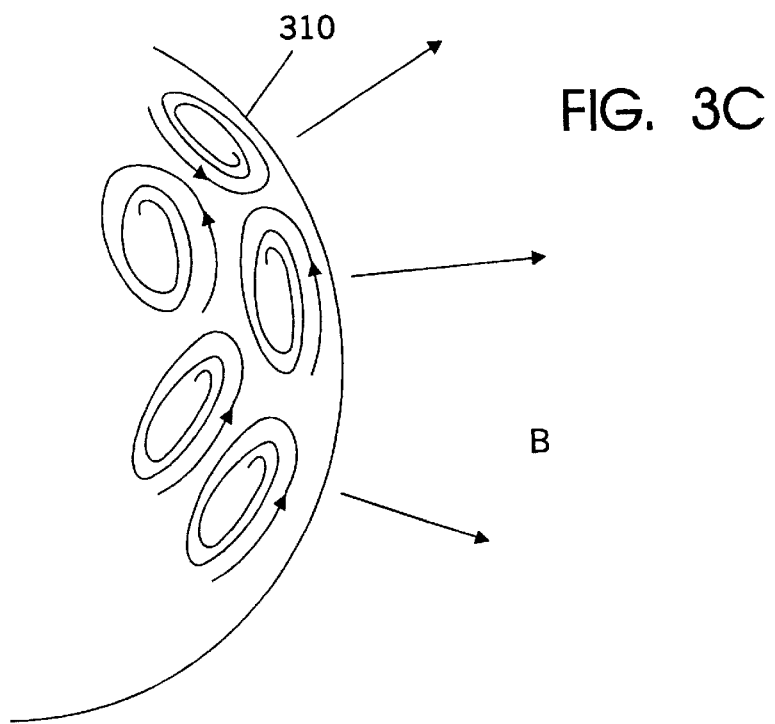
FIG. 3C illustrates an array of in-phase spiral current loops that are disposed adjacent to one another to define a non-planar surface according to the parent application.

FIG. 3B illustrates an array of in-phase elongated spiral current loops. FIG. 3C illustrates an array of in-phase spiral current loops that are disposed adjacent to one another to define a non-planar surface 310. In particular, in FIG. 3C, the spirals are mapped onto the surface of the sphere.

Figure 4:
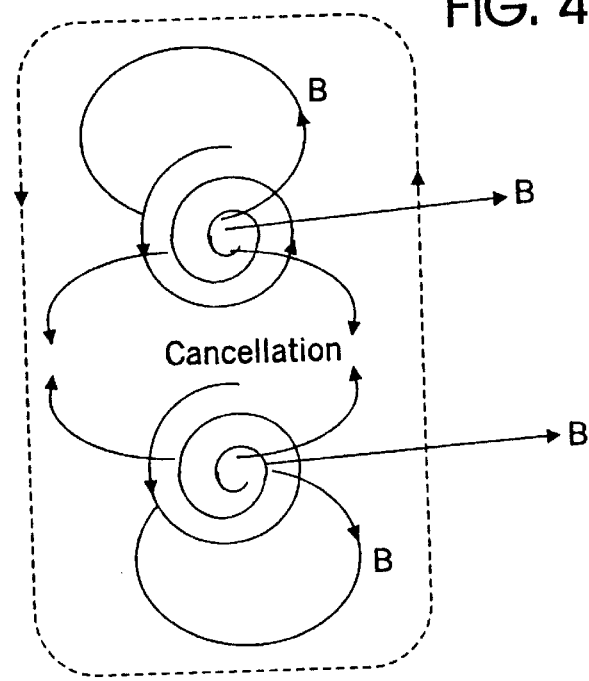
FIG. 4 illustrates field cancellation in a local cancellation area according to the parent application.

Without wishing to be bound by any theory of operation, the virtual current creates a magnetic field (B) which loops around the virtual current loop. The virtual current loop with the virtual current flowing through it creates a dipole of magnetic field which appears like an oval of revolution. At the center of the loop, the magnetic field is normal to the plane of the loop. The bigger the loop, the farther the mid field projects. Closer to the wire segment, the field loops around the wire. Two wire segments carrying equal currents in the opposite direction placed physically close to each other generally produce very little fields because they cancel near field and far field alike. Therefore, current segments on the periphery of the array may be the only significant source of field generation. Since at least some of the far field is due to the phase difference of the current around the loop, keeping the outer loop segments closer to in-phase can reduce the far field generation. Accordingly, an array of in-phase current loops as shown in FIGS. 1A and 3A–3D produce a desired effect for the reasons shown in FIG. 4. FIG. 4 illustrates field cancellation due to adjacent, opposite current carrying segments and a virtual current loop due to the more "in-phase" periphery currents.

It may be difficult to obtain further projection of the mid field by simply increasing the size of the current carrying loop indefinitely due to wavelength considerations. As a loop approaches a significant percentage of the wavelength, it generally becomes a better far field radiator. At a quarter wavelength, a loop that carries even a small current, may transmit enough far field radiation to violate FCC regulations. This appears to be due, at least in part, to current phasing around the loop. Accordingly, in order to reduce far field radiation while producing acceptable levels of mid field, it appears to be desirable to maintain the virtual current loop in-phase so that the same direction virtual current is produced throughout the virtual current loop. Thus, if the virtual current is maintained in-phase around the periphery of the array of current loops, increased mid field may be produced while producing reduced far field.

Figure 5A:
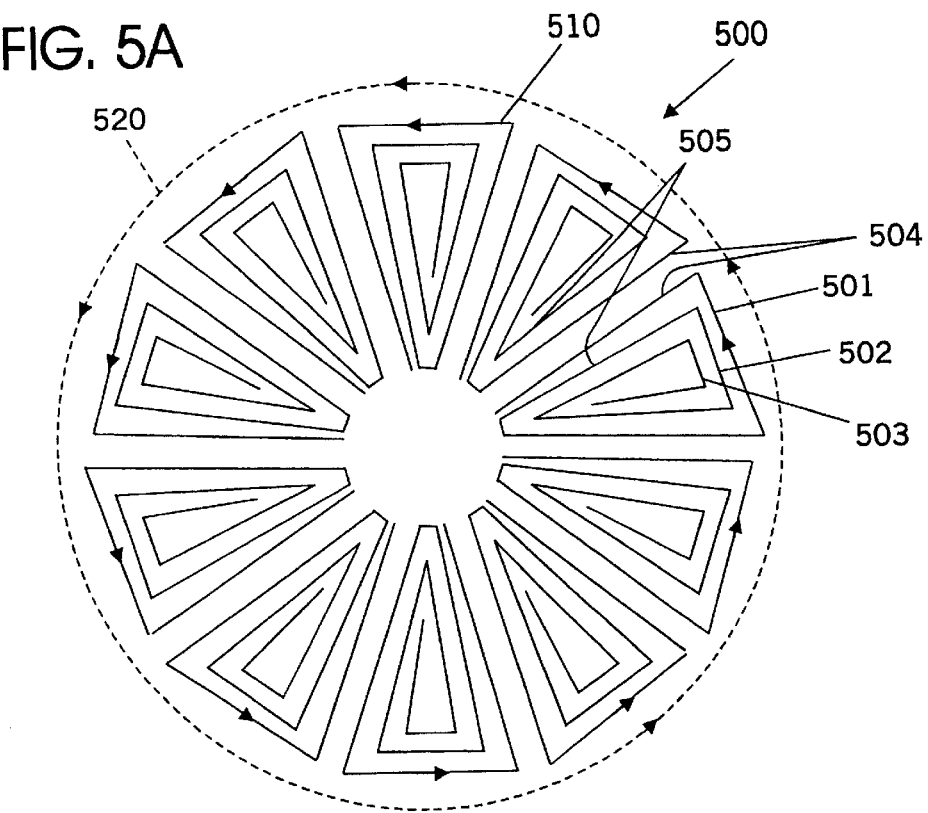
FIGS. 5A–5D illustrate alternate configurations of ten wedge-shaped spiral in-phase current loops according to the parent application.
Figure 5B:
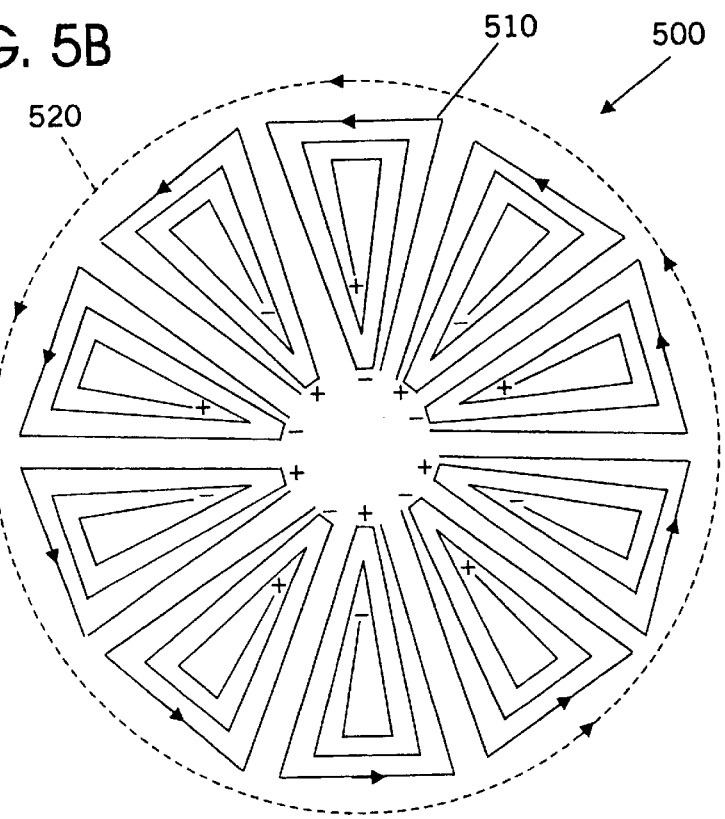
Figure 5C:
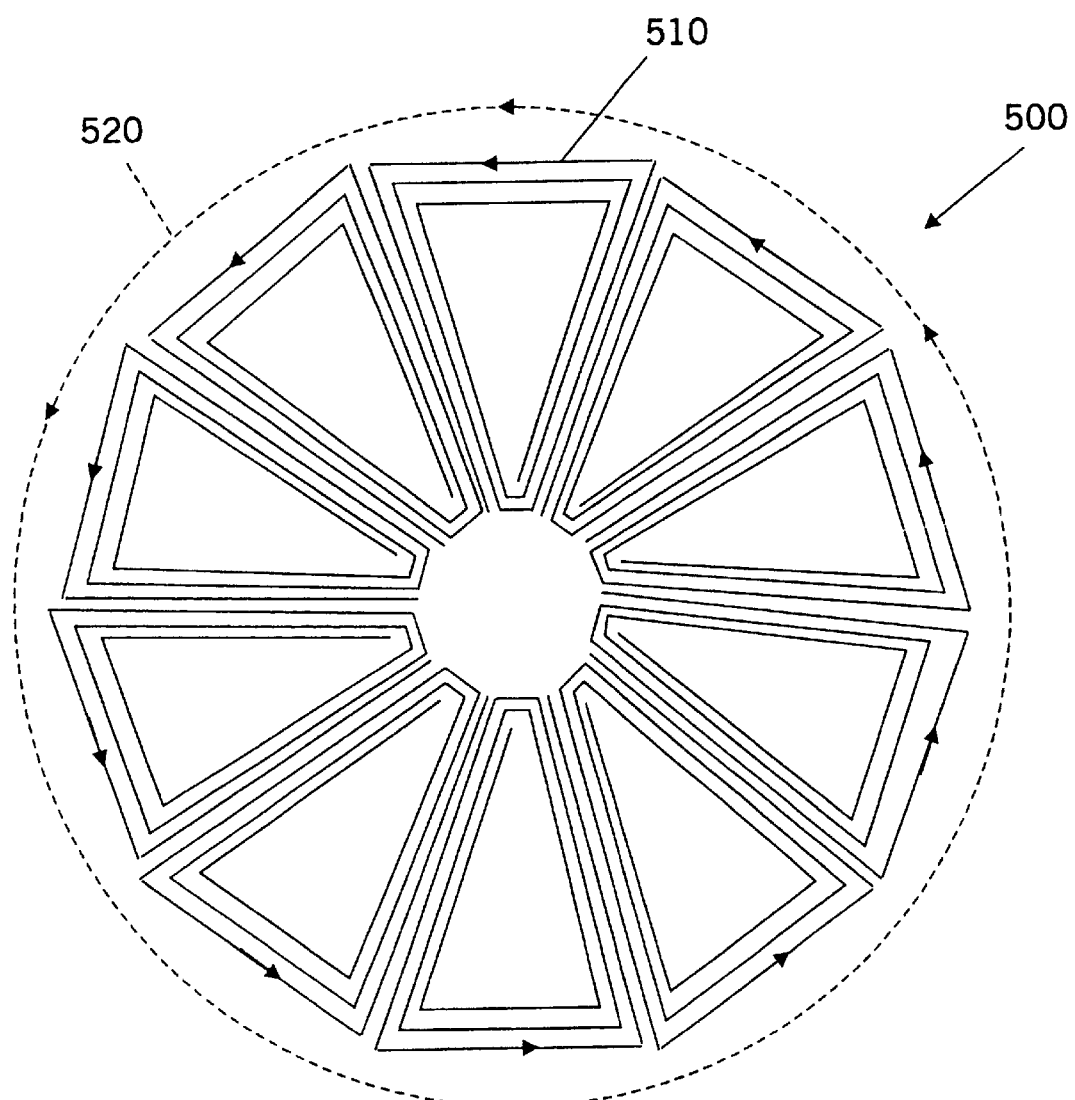

FIGS. 5A–5C illustrate configurations of ten wedge-shaped spiral in-phase current loops 510 that produce a virtual current loop 520. As shown, cancellation of current in adjacent legs of the wedges may take place so that the mid field projection may be produced by the outside legs of the wedges that define the virtual current loop 520. Since the currents on the outside legs are the same distance from the driving point of the array, they are in-phase. Accordingly, the configurations of FIGS. 5A–5C can use a reduced amount of canceling wire, thereby using less power, while generating less far field.

In particular, FIG. 5A illustrates ten identical wedge-shaped three-loop spiral in-phase current loops. It will be understood that any number of wedges may be provided and any number of loops may be provided in the spirals. The virtual current loop 520 is created by the in-phase current contributions of the three outer portions 501–503 of the wedges. The fields created by the legs of adjacent wedges such as legs 504 and 505, preferably substantially cancel.

FIG. 5B illustrates a similar configuration to FIG. 5A, except that alternating wedges are mirror images of one another. In this configuration, an even number of wedges preferably are provided. As in FIG. 5A, the virtual current loop 520 is created by the in-phase current contributions of the three outer portions 501–503 of the wedges. The fields created by the legs of adjacent wedges, such as legs 504 and 505 substantially cancel. Improved cancellation may be obtained compared to FIG. 5A because pairs of canceling legs may be the same length and the same distance from the "+" driving point. The + and − signs indicate how the array may be driven, with all + points electrically connected together and all − points electrically connected together.

FIG. 5C illustrates a similar configuration to FIG. 5A, except the legs of the wedges are moved physically closer. They may even be stacked on different layers of a frame or multilayer printed circuit board so that they overlap one another. The closely spaced or overlapping legs can provide improved cancellation so that virtually all the field contribution comes from the virtual current produced by the three outer portions of each wedge. For the same driving current, this configuration can provide less far field and about the same mid field and the same close-in near field as the configuration of FIG. 5A. Thus, the current can be increased dramatically to produce far more mid field, without violating far field regulatory constraints.

It will be understood that the outer portions of the wedges also may be moved closer together or stacked, as well as the legs of the wedges. This can produce a far field that is the same as if three times the current was flowing in one outer portion. However, the close-in near field also may be approximately three times that of the close-in near field compared to having three legs with ⅓ of the current in each. Accordingly, in contrast with the legs, the outer portions preferably are not moved close together or stacked.

Conversely, if the outer portions are unduly separated, the mid field projection may be reduced since the mid field distance projection is related to the effective size of the outer portions. Thus, the outer portion 502 may not project as far as the outer portion 501. Moreover, the loops preferably are not made too large because the length of the legs may become a larger proportion of the overall length, the inductance may increase and the loop length may become appreciable with respect to the wavelength. The loops also may become too large physically for efficient manufacture and/or use.

Similar phenomenon may occur if too many loops are used in each spiral wedge. The overall loop length may make it difficult to reliably resonate the inductance. In other words, the inductance may become so large that an unreasonably small capacitance may be needed to resonate at 13.56 MHz.

Figure 5D:
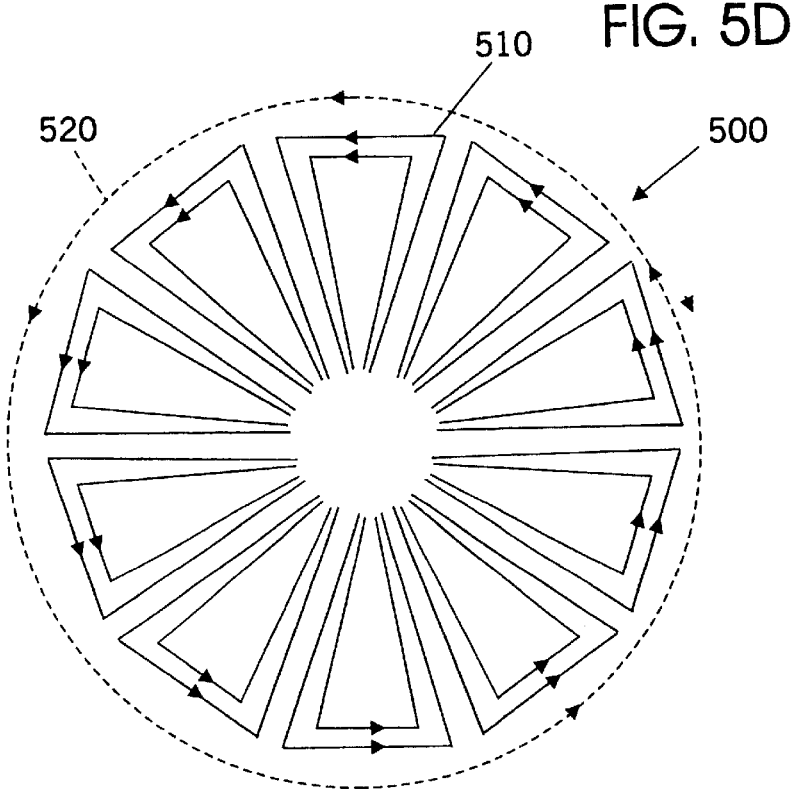

In order to reduce the resonance problem, each wedge may include two or more concentric loops that are wired in parallel, as shown in FIG. 5D. Each loop may be driven independently, with its own resonant capacitor or driver circuit. It also will be understood that the configurations of FIGS. 5A–5D may be combined, for example to provide a combined spiral and parallel loop approach.

Figure 6:
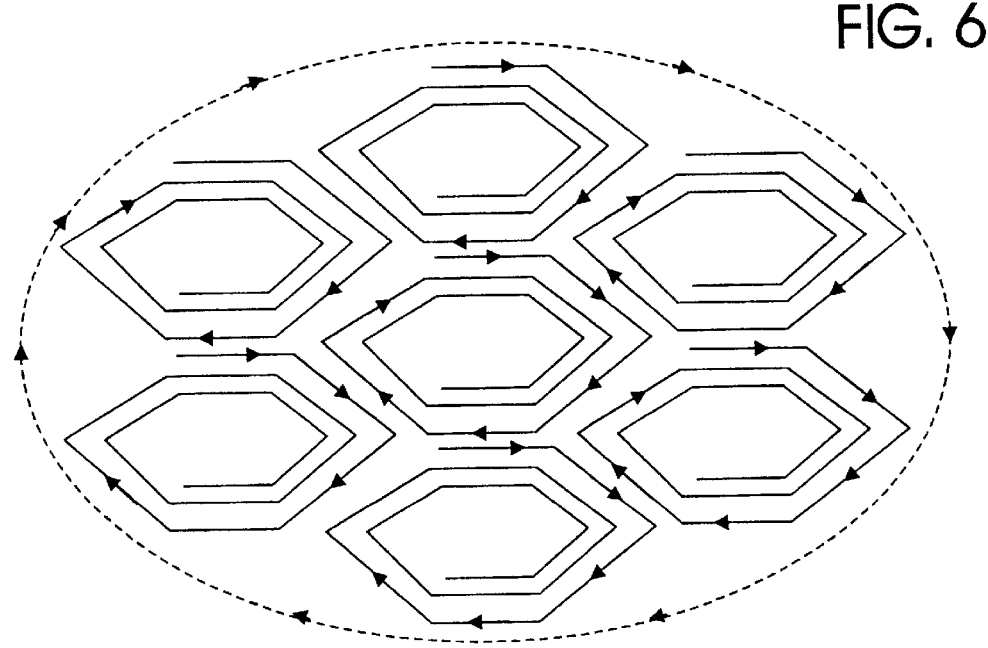
FIG. 6 illustrates an array of identical hexagonal-shaped in-phase current loops according to the parent application.

FIG. 6 illustrates an array of identical hexagonal-shaped in-phase current loops. As shown in FIG. 6, the six-edge pairs of wires can have identical current flowing in opposite directions. Magnetic fields of each of the spirals still project outward and add. The virtual current loop 520 projects mid field while allowing reduced far field. It will be understood that the current loops can be other polygonal shapes such as squares, triangles, rectangles, etc. and also can be circular or elliptical. Moreover, the array need not be symmetrical, and all the individual loops need not be identical. The hexagonal-shaped, in-phase current loops of FIG. 6 may allow shorter wire lengths of the individual loops. The inner segments may cancel well due to equal and opposite currents flowing adjacent to one another. The peripheral segments do not cancel, and produce the virtual current loop as shown in FIG. 6. By adding more hexagonal-shaped, in-phase current loops, the virtual current loop may be made larger. Similar effects may be obtained with triangle-shaped current loops. Other polygonal shapes such as hexagons may not be nested as well to provide almost complete cancellation of inner segments, due to the configuration of other polygons.

The arrays of in-phase current loops as illustrated in FIGS. 1A, 3A–3C, 5 and 6 may still produce some far field radiation. However, according to the parent application, this far field radiation may be further reduced by providing multiple arrays of in-phase current loops wherein each array of in-phase current loops defines a virtual current such that virtual currents of at least some adjacent arrays of in-phase current loops are of differing phase with respect to one another. Since the far field is measured at 30 meters, per FCC Regulations Part 15, multiple arrays of in-phase current loops can produce the opposite radiation at 30 meters and thus cancel at least some more of the far field. By separating identical arrays by small distances, relative to the 22 meter wavelength, the strength of the close-in near and mid fields may not be affected as much as the far field.

Figure 7A:
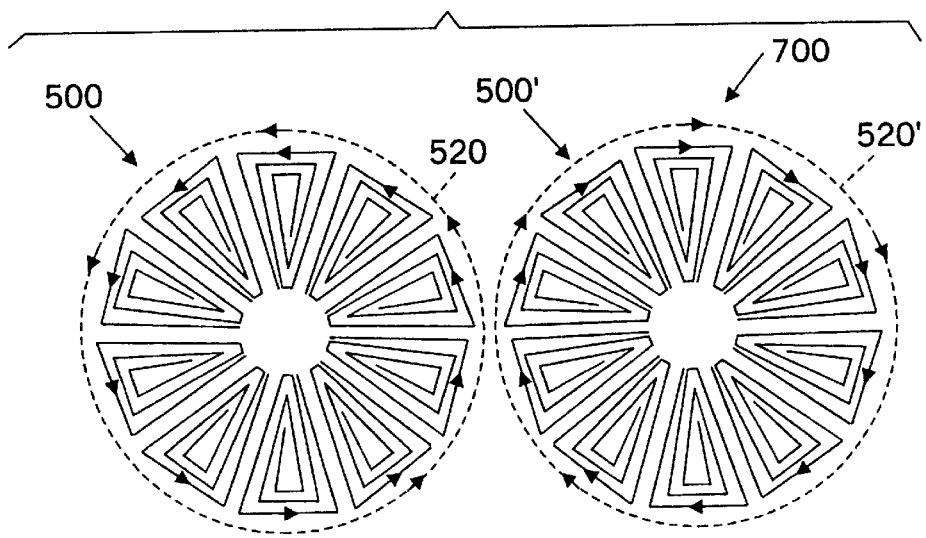
FIG. 7A illustrates two arrays of in-phase current loops according to the parent application.
Figure 7B:
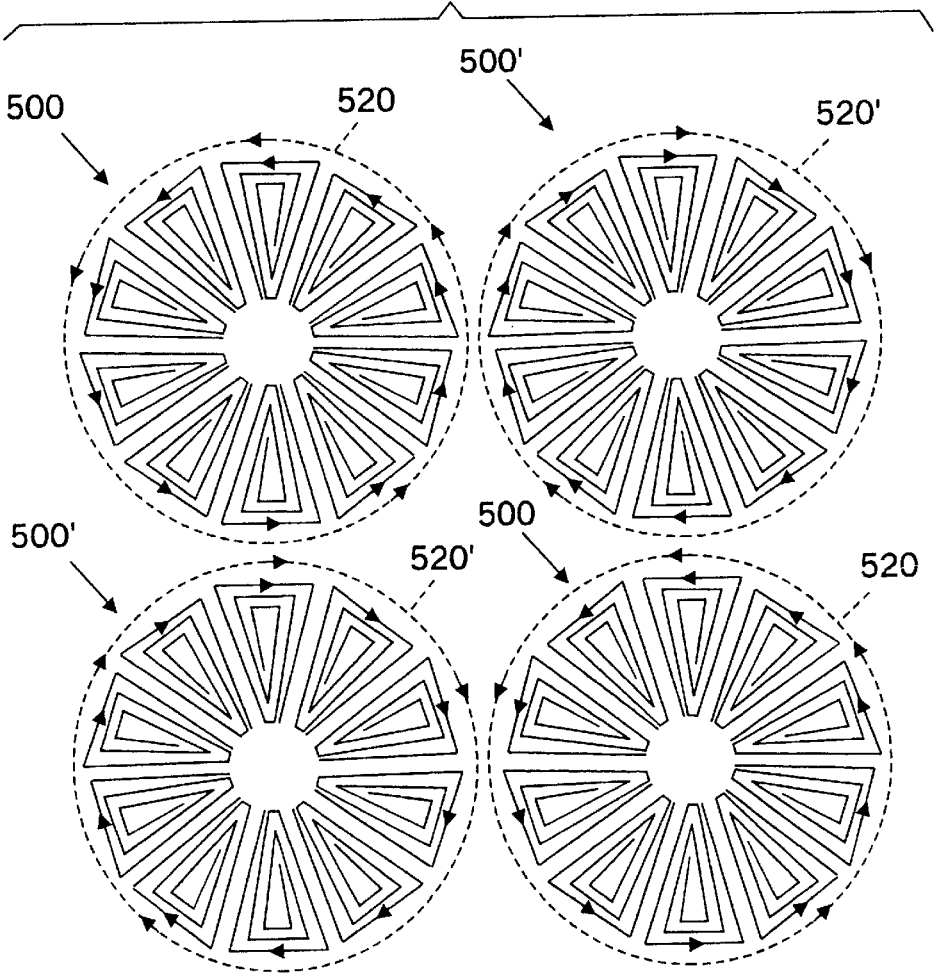
FIG. 7B illustrates two rows and two columns of arrays of in-phase current loops according to the parent application.

Thus, as shown in FIG. 7A, two arrays 500 and 500' of in-phase current loops are provided that define virtual currents 520 and 520' that are 180° out-of-phase with one another. Stated differently, they are of opposite phase. Although there may be some cancellation of the near field and mid field, there may be a larger amount of cancellation of the far field. FIG. 7B illustrates two rows and two columns of arrays of in-phase current loops with alternating clockwise and counter-clockwise virtual current flow. This arrangement may be able to cancel the far field in more directions better than the arrangement of FIG. 7A. It will be understood that the terms "row" and "column" are used herein to indicate two directions that are not necessarily horizontal and vertical.

Figure 7C:
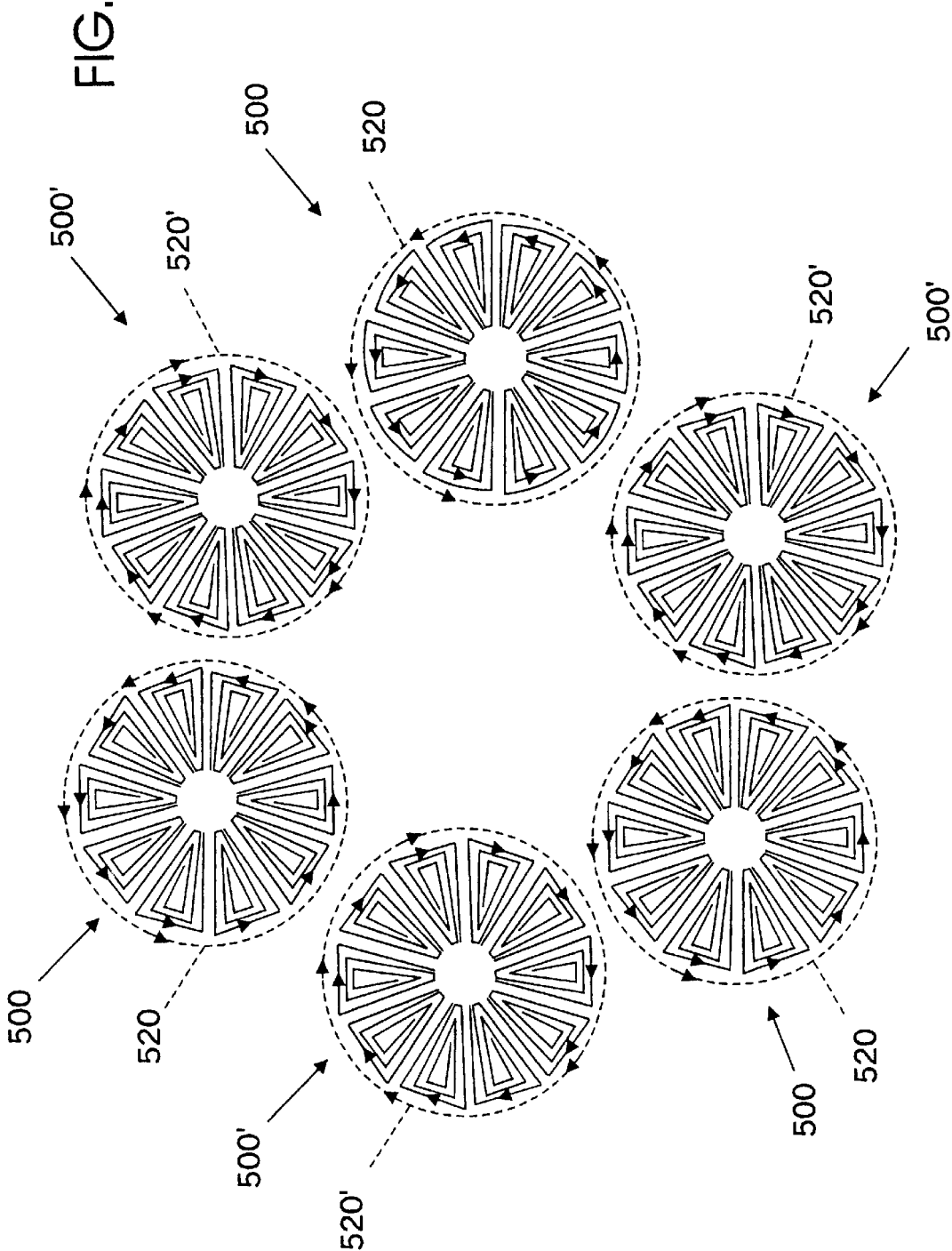
FIG. 7C illustrates a plurality of arrays of in-phase current loops arranged in a circle according to the parent application.

FIG. 7C illustrates yet another arrangement wherein a plurality of arrays of in-phase current loops are arranged in a circle with the virtual currents of adjacent arrays being 180° out-of-phase with one another. In other alternative embodiment, the virtual currents of adjacent arrays are 180°/n or 360°/n out-of-phase with one another, where n is the number of arrays of in-phase current loops. These arrangements may be able to cancel the far field in still more directions.

In yet another embodiment, the virtual currents of a subset of the arrays are 180°/n or 360°/n out-of-phase where n is the number of arrays in a subset. Any integer number of subsets may be combined. Finally, in any of these embodiments, the individual arrays can be rotated to any angle with respect to one another, arranged in any order and/or placed in any pattern close together.

It also will be understood that one or more of the arrays may only include a single current loop. Thus, for example, an array of single current loops in any of the configurations and/or phase relationships described above may be used to project the mid field while reducing far field radiation. Using simple loops may allow less drive circuitry and may be acceptable in portable applications where projection into a relatively large volume may not be needed.

Figure 8:
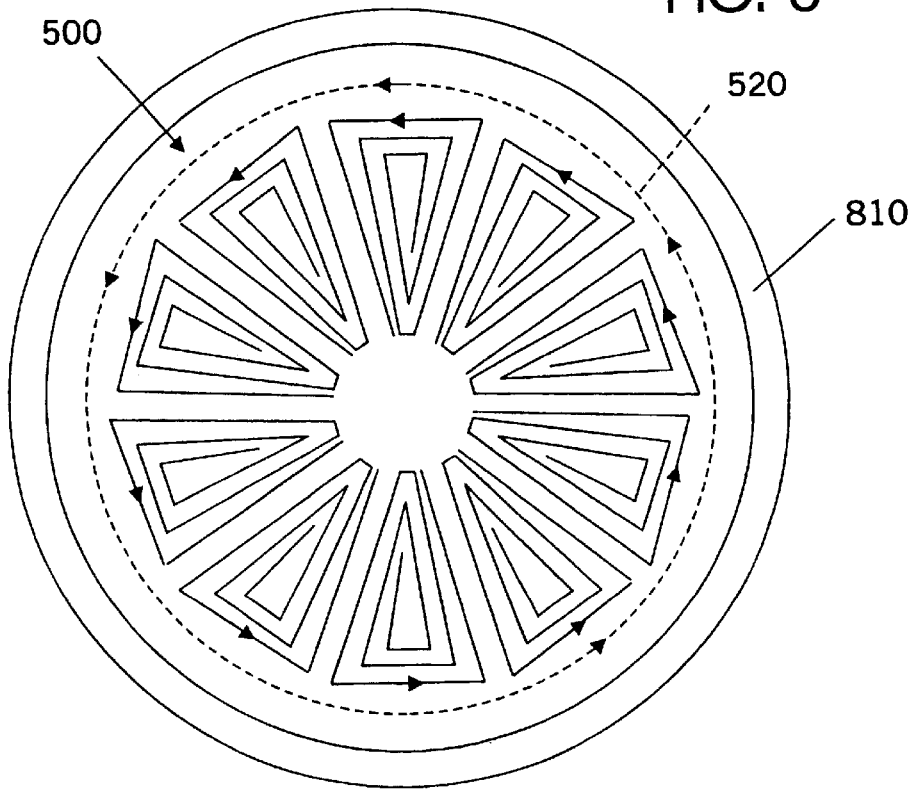
FIG. 8 illustrates a grounded shield surrounding an array of current loops according to the parent application.

The array also can use a shield around the outside edge to absorb spurious far field generated by the array. See FIG. 8 which shows a grounded metal shield 810 that can comprise steel or iron, surrounding the outside of an array to reduce spurious far field propagation. It will be understood that the shield may be placed around individual loops, individual arrays or a plurality of arrays.

The impedance of each spiral may be dependent on the configuration and current flowing in adjacent elements. By controlling the current to thereby match the different impedances of each current loop individually, the overall performance also can be improved.

Figure 9A:
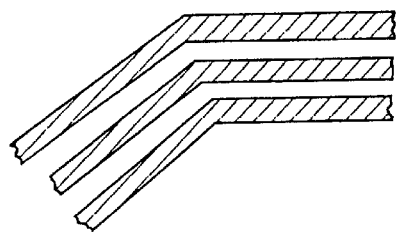
FIGS. 9A, 9B, 10 and 11 illustrate printed circuit board embodiments of the parent application.
Figure 9B:
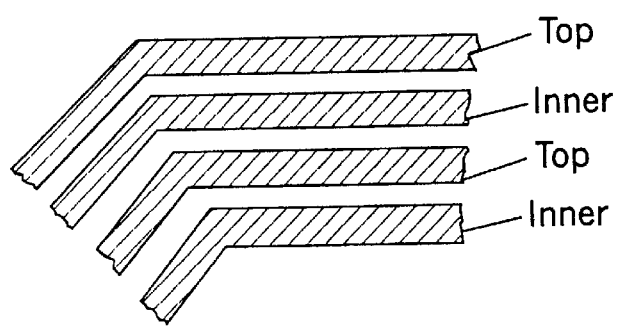
Figure 10:
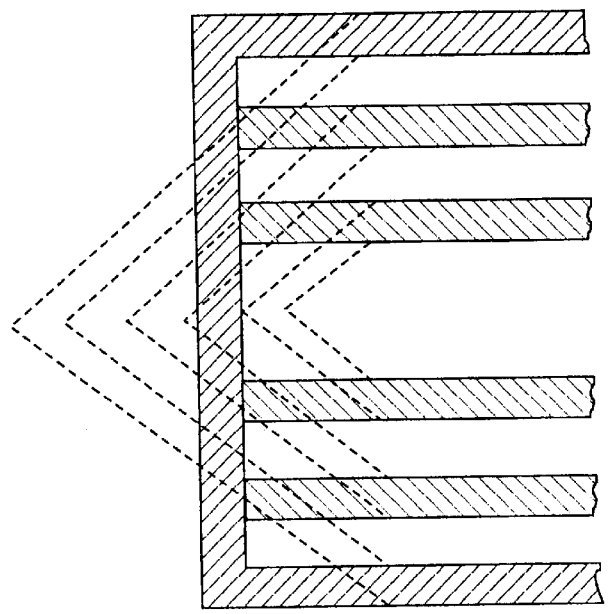
Figure 11:
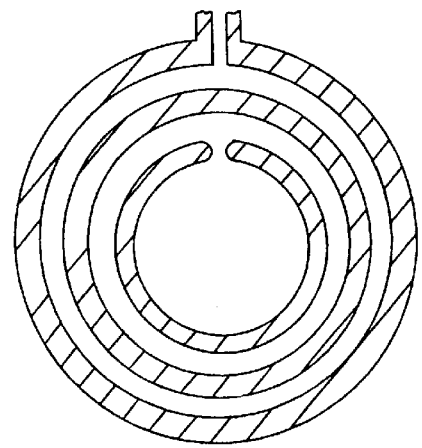

It will be understood that the current loops of the parent application may be freestanding wires. A supporting frame that supports the wires at various points also may be provided. Moreover, the current loops may be formed on a substrate that can support the entire plurality of arrays of current loops. The substrate may be one or more printed circuit boards. Multi-layer circuit boards may be utilized to run wires with currents behind or interdigitated with existing elements. See FIG. 9A which illustrates traces on a printed circuit board that may be stacked on different levels and FIG. 9B which illustrates interdigitated top level and inter-level traces. Moreover, as illustrated in FIG. 10, the edge of the outside spirals may be stacked to promote single line cancellation. Large currents or extreme phase control of the individual turns also may be implemented with concentric loops instead of spirals which may be implemented by multi-layer printed circuit boards. See FIG. 11.

Figure 12:
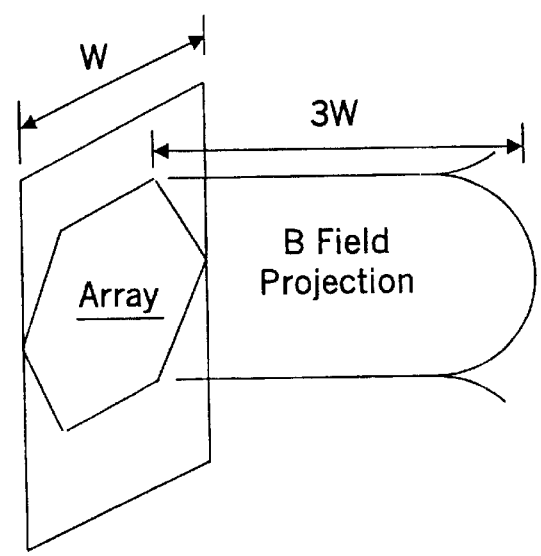
FIG. 12 schematically illustrates widening of an array of current loops according to the parent application.

Any number of elements can be used in the array to form any shape. Calculations and experimental results show that the magnetic field is projected to approximately three times the width of an array. Thus, to cover a larger volume, a wider array may be used. See FIG. 12.

For maximum power collection at the tag, the receiving device should be electrically matched to the transmitting array. In addition, the more of the mid field flux lines that go through the receiving loops, the more power that generally can be projected. Since the array projects a magnetic field that is initially normal to the plane of the array, tags oriented parallel to the array generally may receive a higher density of flux through them. In some cases, a tag's orientation may be such that so little flux is received that it remains undetected. However, orientation independence can be achieved with different methods.

Figure 13A:
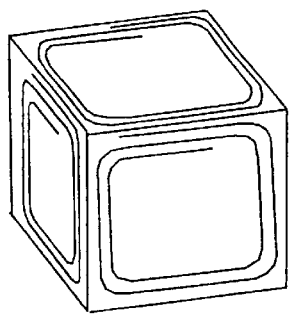
FIGS. 13A and 13B illustrate embodiments of receiving devices according to the parent application.
Figure 13B:
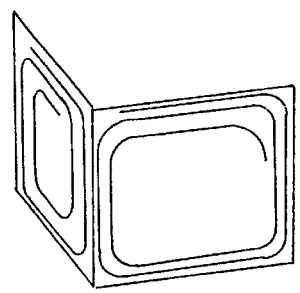

For example, a two- or three-dimensional series of loops at the receiving device can increase the likelihood that a certain amount of flux passes through one or more of the loops regardless of orientation. See FIG. 13A which illustrates three loops of wire at a tag, one in each orthogonal dimension to reduce orientation problems. FIG. 13B illustrates a two-dimensional version of a receiving device that can capture flux lines that are perpendicular to the planes defining the spirals.

In another embodiment, multiple projecting arrays may be provided. Moreover, rows and columns need not extend in the horizontal and vertical directions. Rather, oblique rows and columns may be provided as illustrated in FIG. 1B. Thus, an increased likelihood that a horizontally or vertically traveling RFID tag will receive enough flux to power the RFID tag may be provided.

Figure 14:
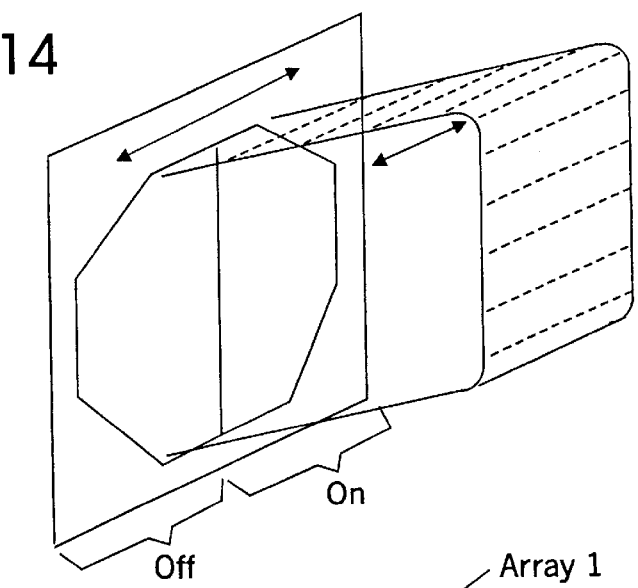
FIG. 14 illustrates sweeping the phase across an array according to the parent application.

In another alternative, changing the phase and/or magnitude of current through a portion of the projecting array can modify the shape and direction of the projected magnetic field. Moreover, by sweeping the phase across the array, a collimated beam of flux can be moved electronically. See FIG. 14. As schematically shown in FIG. 14, a beam can be moved by changing which part of the array is on or off or by slowly changing the relevant phase and/or magnitude of currents in each element. Thus, by changing the position of the magnetic field, all devices in a volume can receive enough flux to be powered.

In yet another alternative, the phase of the plurality of arrays may be changed over time to thereby produce a similar far field while moving nulls of the mid field in space over time. For example, in the plurality of arrays of FIGS. 7A–7C, the illustrated phase relationships may be maintained for a first time period, such as one second, and second phase relationships may be maintained for succeeding time periods. Thus, for example, in a second time period, a 60° phase leg may be introduced into each of the plurality of arrays. In a third time period an additional 60° phase leg may be introduced, etc. Although this may not impact the far field, it can spatially move the nulls in the mid field to increase the likelihood that all devices in a volume can receive enough flux to be powered.

Figure 15:
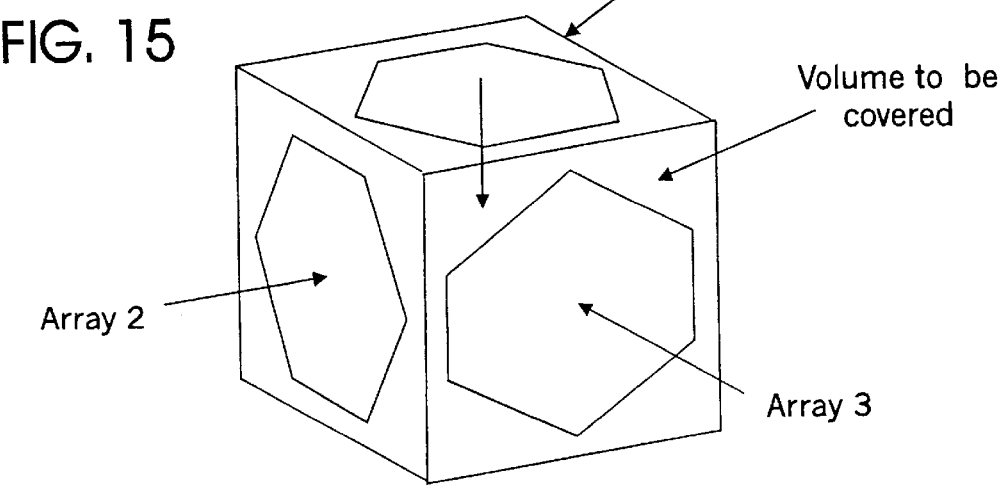
FIG. 15 illustrates three arrays that project into a volume according to the parent application.
Figure 16:
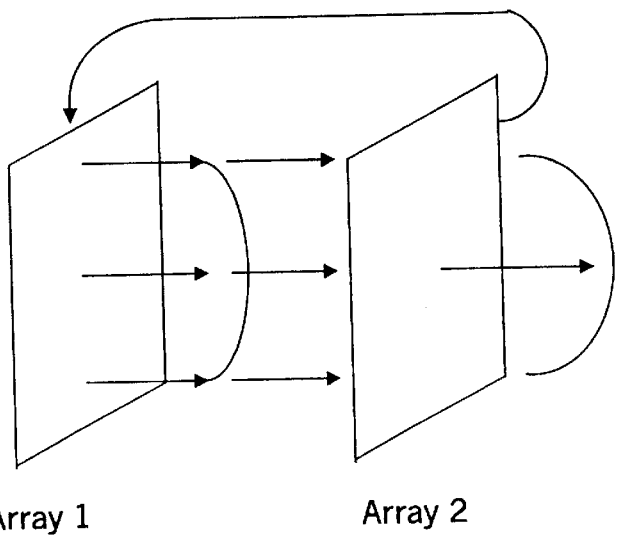
FIG. 16 illustrates a pair of spaced apart arrays according to the parent application.

Yet another approach may add one or more arrays that project into the volume. Since magnetic fields add as vectors, the field at any point in the volume is a vector sum of all the contributions of the individual current segments. Thus, changing the magnetic field from any or all of the individual arrays may be used to dynamically change the direction and strength of the field at any point. Finally, multiple arrays may be included, each covering a different dimension of the volume. See FIG. 15 in which three arrays are provided wherein Array 1 can project downward, Array 2 can project to the right and Array 3 can project back in the volume to be covered. Each dimension can then be activated independently. In order to extend the magnetic field even further, additional antennas may be placed directly across from the first with the same field polarity orientation. See FIG. 16. This can almost double the effective distance that can be obtained with a single antenna. Since the magnetic fields add, two arrays oriented in the same direction can effectively double the coverage space. It will be understood that the arrays can be activated independently or together.

Figure 17:
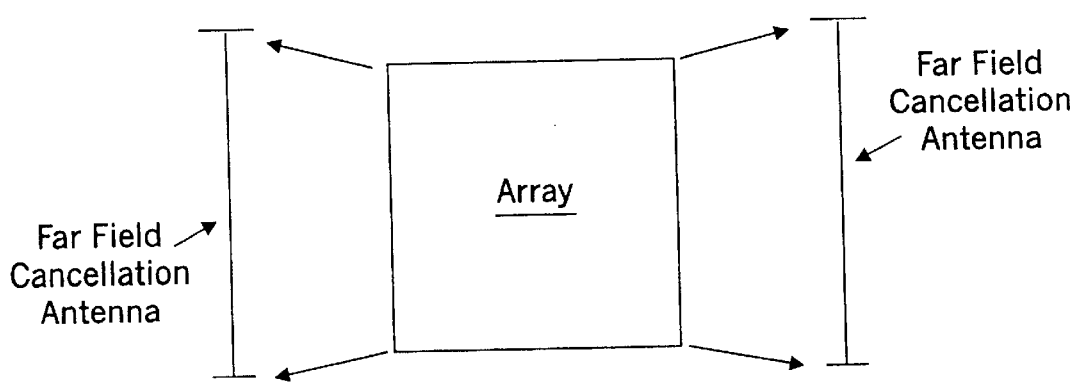
FIG. 17 illustrates a pair of far field cancellation antennas about an array according to the parent application.

Even though spirals or loops may be inefficient far field radiators, some component of the far field may be produced. In order to further reduce this component, additional antenna elements may be placed about the mid field to destructively interfere with the far field. See FIG. 17 which illustrates a pair of far field cancellation antennas about an array. The far field cancellation antennas may be made adaptive. Further reduction of undesired far field generation may be obtained by shielding the connections going to the array, for example, using coaxial cable or shielded twisted wire pair. The effects of current carrying wires from the matching networks to the antenna elements can be reduced by keeping them short, shielded and uniform.

It also will be understood that one or more sensing antennas may be provided to sense communications from the devices. The sensing antennas preferably are dipoles. Spatially separated, orthogonally oriented dipoles may be provided to increase the ability to detect communications while reducing the likelihood of destructive interference among the device communications to the antennas.

Accordingly, the systems and methods of the parent application can create mid field magnetic energy that can be made wide and deep without excessive far field generation and without excessive field strength near the antenna structure. The magnetic field can be used to operate electronic devices remotely. These electronic devices may include RFID tags, remote sensors such as implanted temperature sensors, and/or remote actuators such as a relay inside a vacuum. Furthermore, other applications desiring a strong-shaped magnetic field for unlicensed operation may benefit from the parent application.

In order to demonstrate how the parent application can increase the mid field while reducing the far field, a series of simulations were performed for various antenna configurations. In order to normalize the simulation results, each system was simulated so that at 30 meters, the magnetic field just passes FCC regulations, i.e., the magnetic field is just under 10,000 microvolts per meter. Then, a mid field measurement is simulated at 3 meters (118.1 inches). The amount of current in each loop is also indicated. Thus, the simulations indicate a maximum mid field that can be produced at 3 meters without violating FCC regulations at the far field. Table 1 summarizes the results of the simulations. Each of the simulations will now be described.

TABLE 1

| Configuration | FIG(s). | Current/loop. A | H@ 3 meters, A/m |
|---|---|---|---|
| 10" diameter loop | 18, 19 | 0.81761 | 0.000421 |
| 20" diameter loop | 18, 20 | 0.205317 | 0.000417 |
| 40" diameter loop | 18, 21 | 0.0522617 | 0.000399 |
| 20" diameter bi-loop | 22, 23 | 0.607701 | 0.000932 |
| 20" diameter bi-loop | 24, 25 | 0.610333 | 0.000933 |
| 20" square loop | 26, 27 | 0.126952 | 0.000389 |
| 20" quad wedge | 28, 29 | 0.474899 | 0.000926 |
| 2 × 20" quad wedge | 30, 31 | 3.02641 | 0.001394 |
| 4 × 20" quad wedge | 32, 33 | 38.1075 | 0.002661 |
| 6 × 20" quad wedge | 34 | 3.02888 | 0.001199 |
| 6 × 20" quad wedge, 60° offset | 35, 36 | 17.6789 | 0.005598 |
| 6 × 20" quad wedge, spiral, 60° offset | 37, 38 | 9.87382 | 0.00559 |

Figure 18:
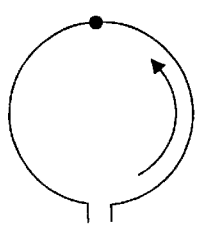
FIG. 18 illustrates a single current loop.
Figure 19:
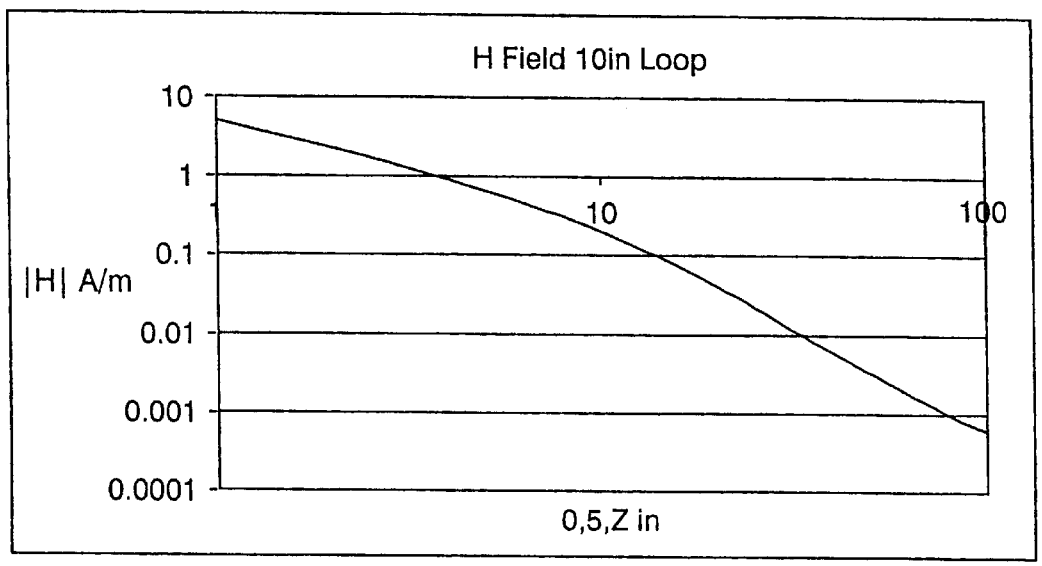
FIGS. 19, 20 and 21 graphically illustrate a simulated magnetic field as a function of distance, for a single current loop of FIG. 18.

FIG. 18 illustrates a single ten-inch diameter loop. The dot in FIG. 18 and in the remaining figures indicates the X-Y axis location for taking Z axis measurements at 3 meters and at 30 meters. For the configuration of FIG. 18, the magnetic field at three meters was 0.00421 A/m with a current of 0.81761 amps. FIG. 19 is a log/log plot of the H field as a function of distance along the Z axis from one to 100 inches. Accordingly, the close-in near field is indicated to the left of the ten-inch mark in FIG. 19 and the mid field is indicated to the right of the ten-inch mark in FIG. 19.

Figure 20:
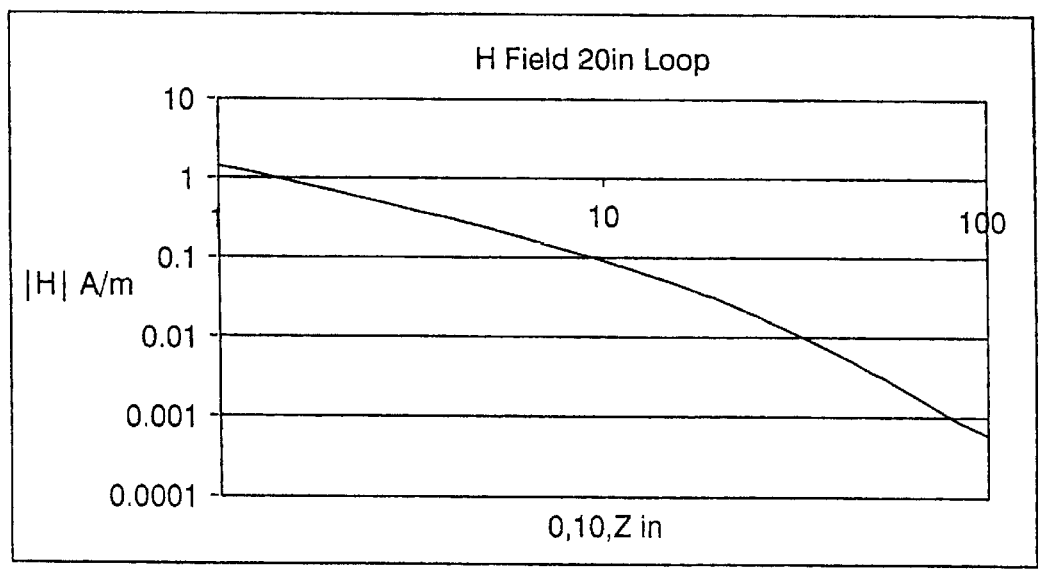

For a 20-inch diameter loop, the H field at three meters was simulated to be 0.00417 A/m at a current of 0.205317 A. A log/log plot of the H field versus distance on the Z axis for a 20-inch loop is shown in FIG. 20.

Figure 21:
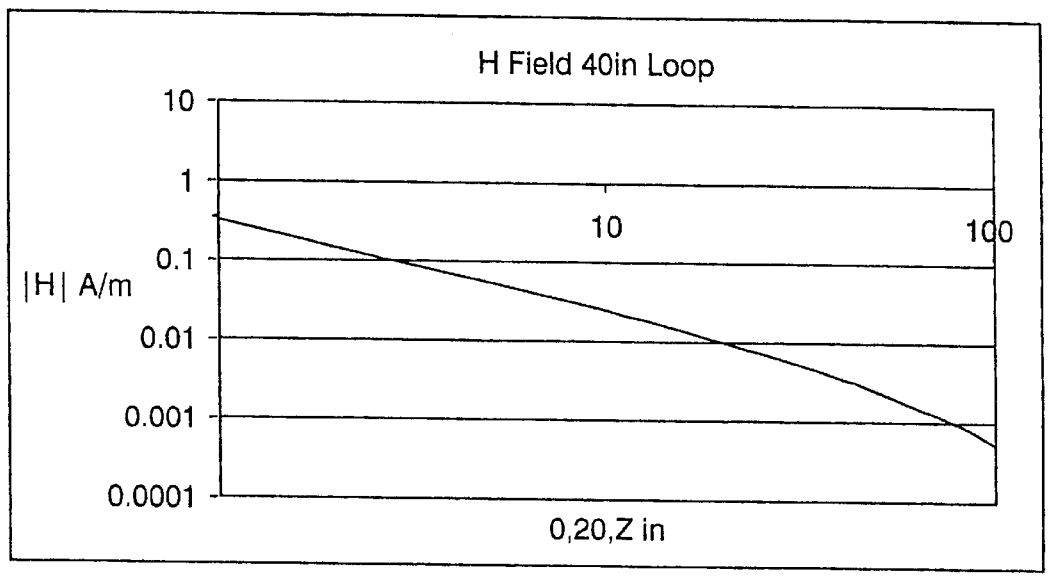

For a 40-inch diameter loop of FIG. 18, an H field at 3 meters of 0.000399 A/m at a current of 0.0522617 A was simulated. FIG. 21 is a log/log plot for the 40-inch diameter loop.

Comparing the ten-inch loop, 20-inch loop and 40-inch loop, it can be seen that the mid field produced can be about the same using less current.

Figure 22:
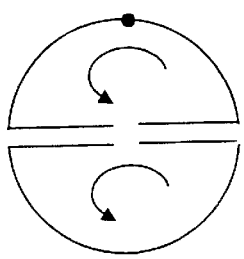
FIGS. 22, 24, 26, 28, 30, 32, 34, 35 and 37 illustrate various configurations of arrays of current loops according to the parent application.
Figure 23:
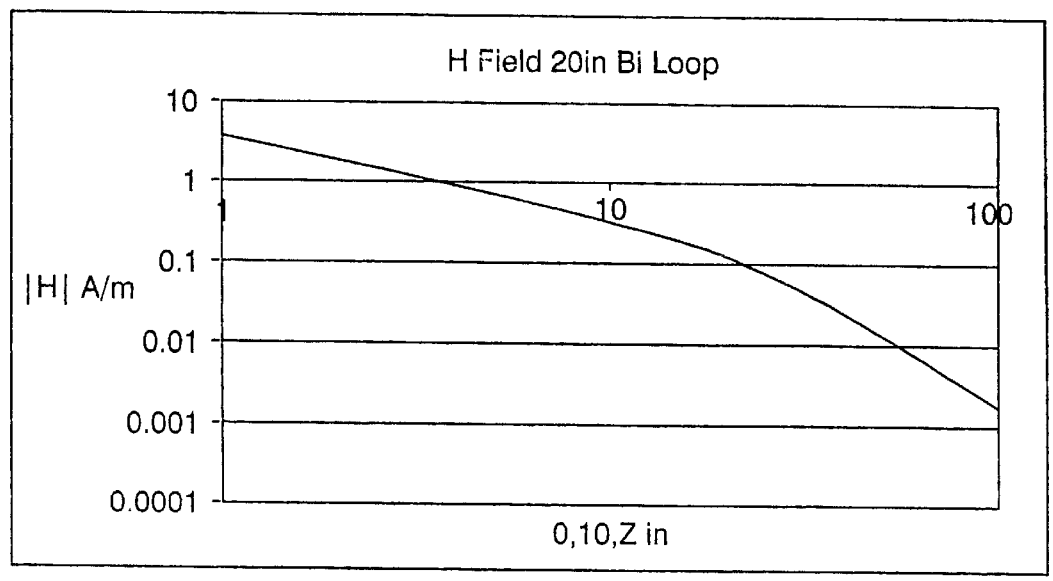
FIGS. 23, 25, 27, 29, 31, 33, 36 and 38 graphically illustrate a simulated magnetic field as a function of distance, according to the parent application.

FIG. 22 illustrates a 20-inch diameter bi-loop which may also be thought of as a pair of in-phase current loop wedges. A simulated mid field of 0.00932 A/m was produced at a current of 0.6077701 A. FIG. 23 is a log/log plot of the simulated near field and mid field. As shown by comparing FIGS. 20 and 23, the 20-inch diameter bi-loop can produce a larger mid field than a 20-inch diameter loop, without violating FCC regulations.

Figure 24:
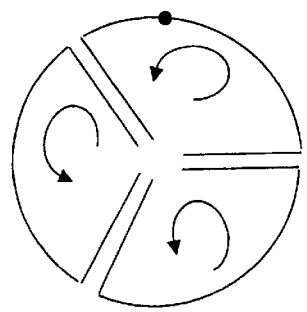
Figure 25:
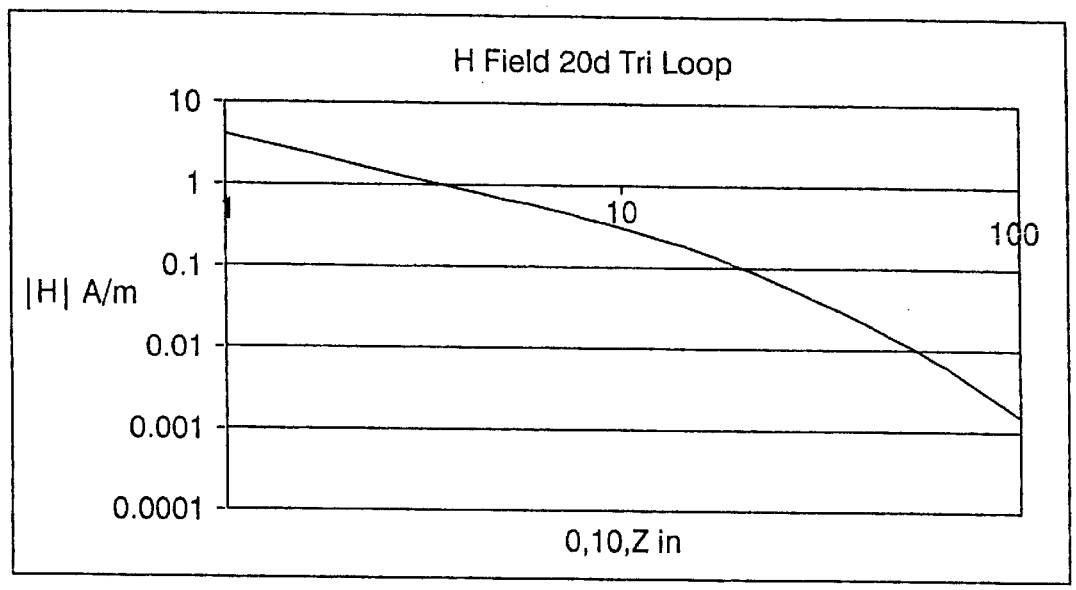

FIG. 24 illustrates a 20-inch diameter tri-loop. A mid field of 0.00933 A/m was simulated at a current of 0.610333 A. FIG. 25 graphically illustrates the close-in near field and mid field components.

Figure 27:
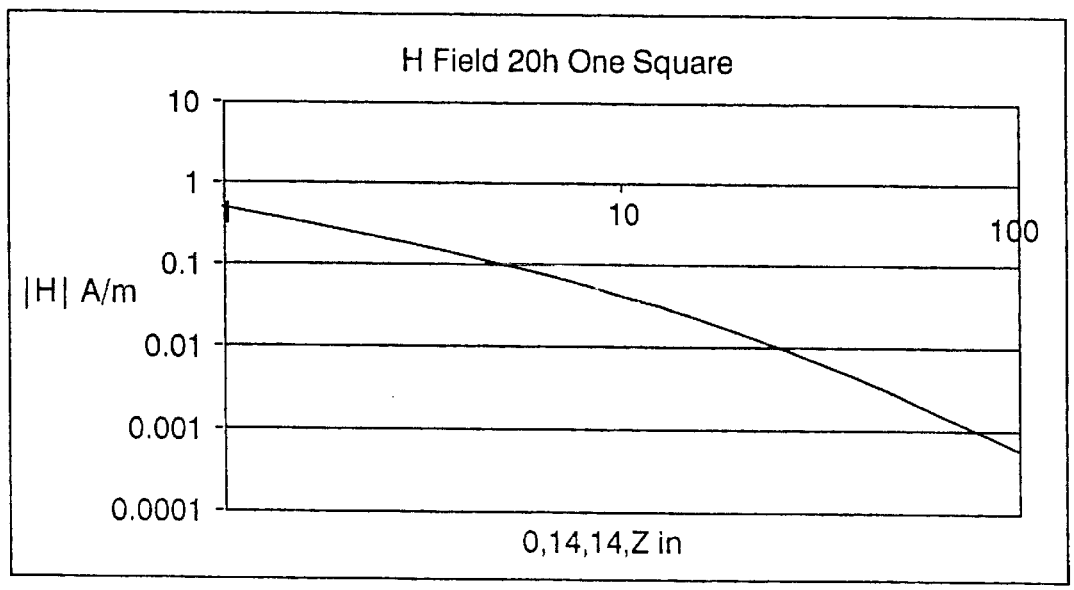
Figure 26:
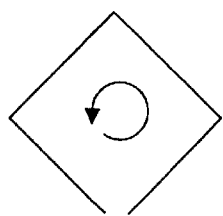

FIG. 26 illustrates a 20-inch square loop. A mid field of 0.00389 A/m was produced with a current of 0.126952 A. Accordingly, there may not be a large difference between square and circular loops, but the square loop may be easier to fabricate and support. FIG. 27 graphically illustrates the close-in near field and mid field for a 20-inch square loop.

Figure 28:
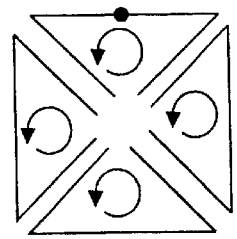
Figure 29:
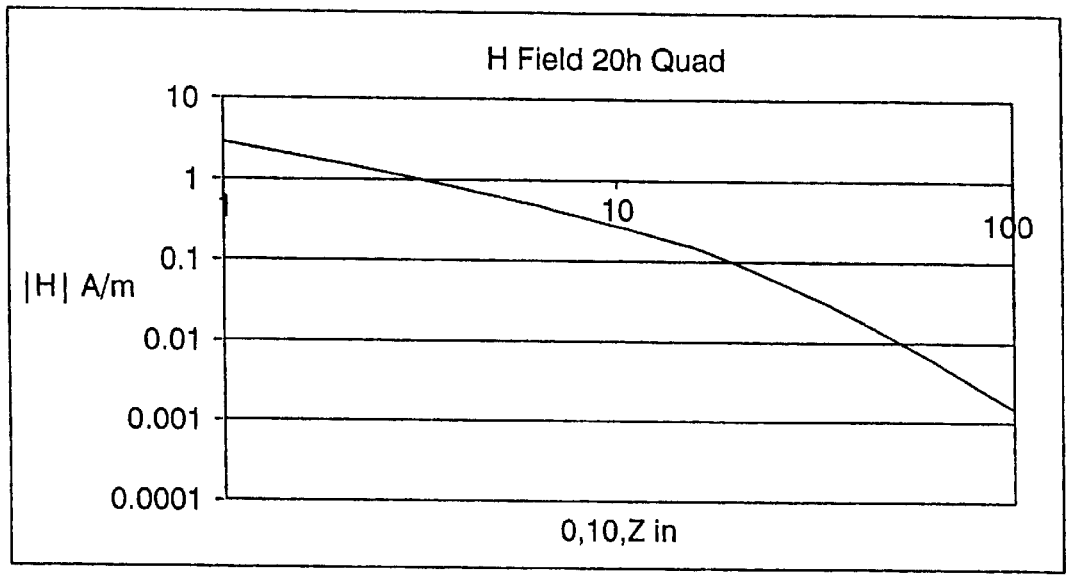

FIG. 28 illustrates a 20-inch quad wedge. Simulations show that a mid field of 0.000926 A/m may be produced at a current of 0.474899 A. Accordingly, a 20-inch quad wedge can provide a large improvement over a 20-inch diameter loop of FIG. 22. FIG. 29 graphically illustrates near field and mid field for the 20-inch quad wedge.

Figure 30:
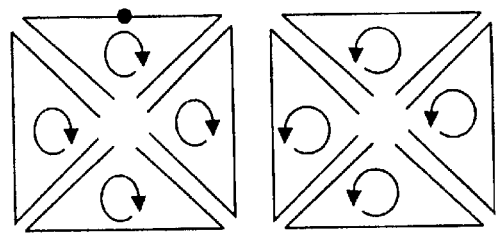
Figure 31:
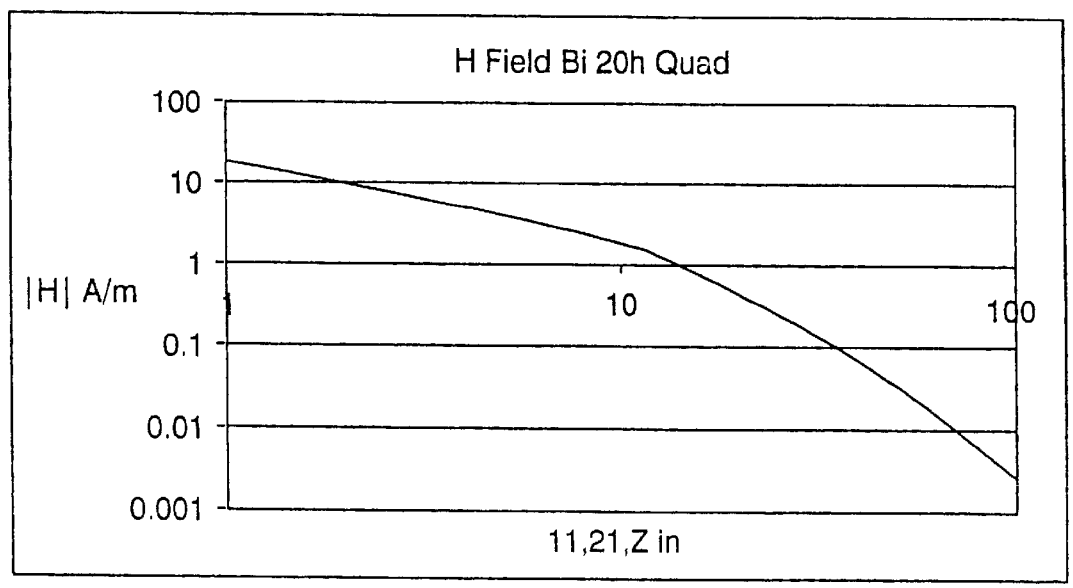

FIG. 30 illustrates two arrays of 20-inch quad wedges. Simulations indicate that a mid field of 0.001394 A/m is produced at a current of 3.02641 A. FIG. 31 graphically illustrates the close-in near field and mid field components.

Figure 32:
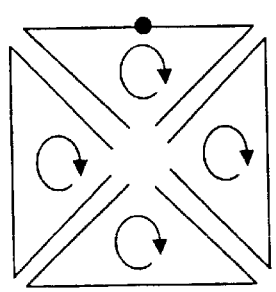
Figure 32:
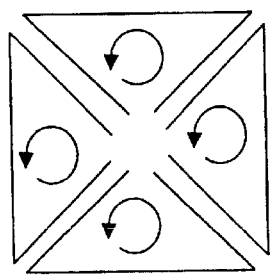
Figure 32:
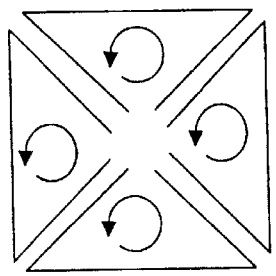
Figure 32:
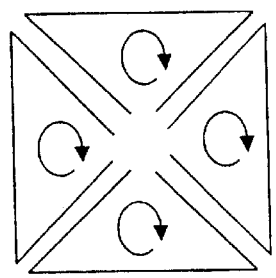
Figure 33:
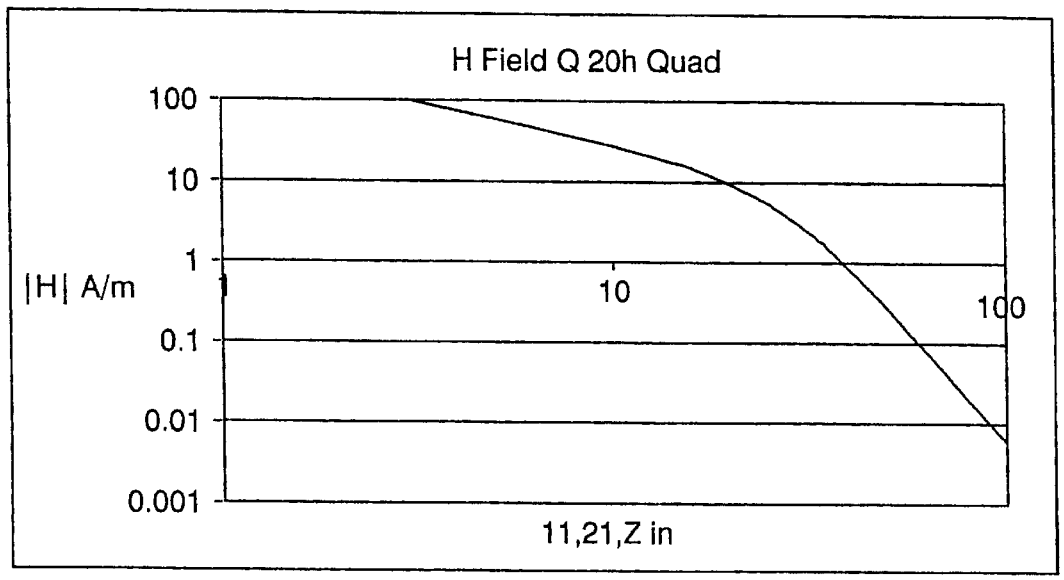

FIG. 32 illustrates four 20-inch quad wedge arrays. A very high mid field of 0.02661 A/m was simulated albeit at high current of 38.1075 A. FIG. 33 graphically illustrates the close-in near field and mid field of this configuration.

Figure 34:
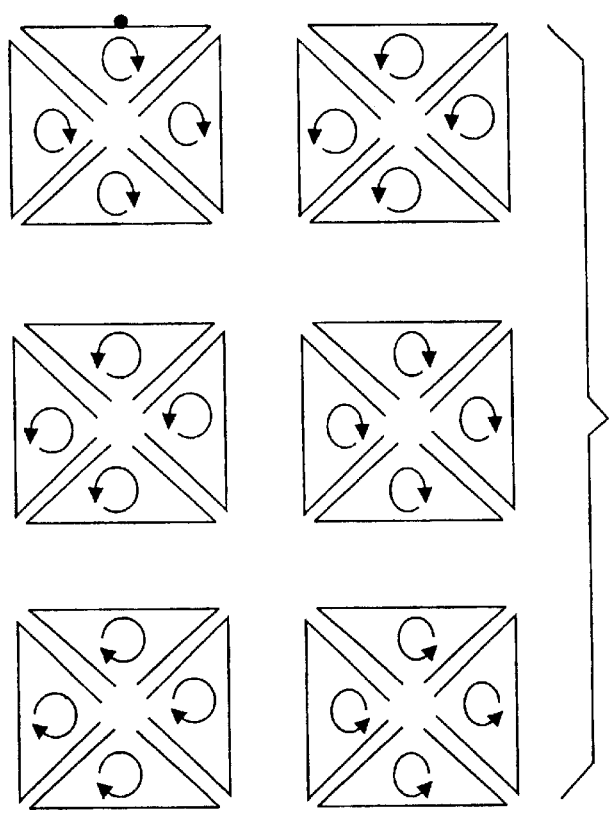

FIG. 34 illustrates six 20-inch quad wedge arrays. Simulations indicate a magnetic field of 0.00119 A/m at a current of 3.02888 A.

Figure 36:
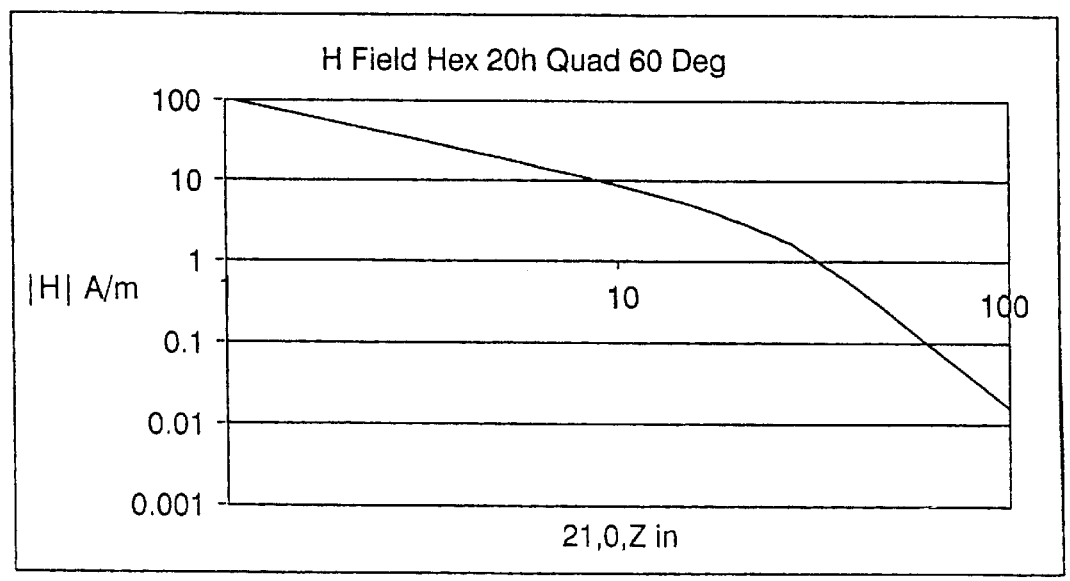
Figure 35:
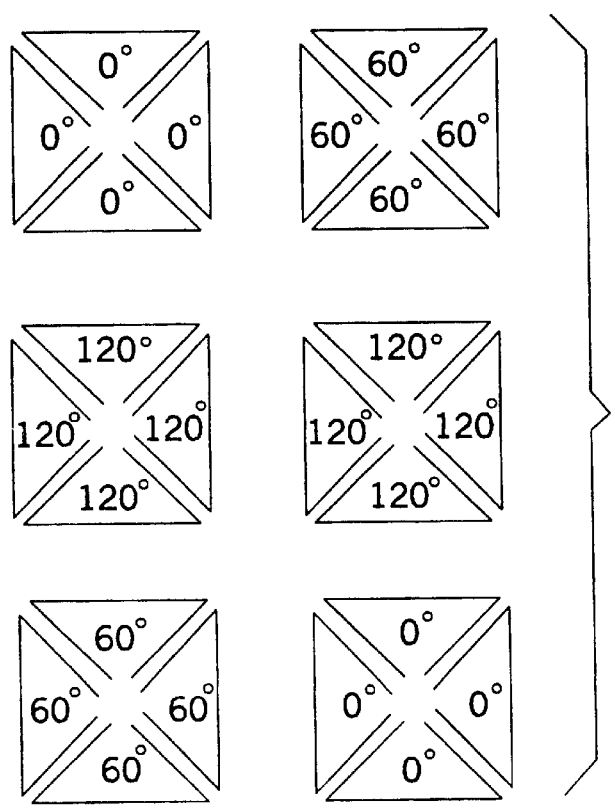

FIG. 35 illustrates six 20-inch quad wedge arrays wherein adjacent arrays are driven at 60° phase offsets from one another. Thus, in contrast with the embodiments of FIGS. 22, 24, 28, 30, 32 and 34, wherein adjacent arrays are driven in opposite phase, FIG. 35 illustrates phase offsets that are different from 180°. These phase offsets can provide a more spatially uniform near field relative to arrays that have 180° phase differences. Simulations indicate that the array of FIG. 35 can provide a mid field of 0.005598 A/m at a current of 17.6789 A. Accordingly, a very high mid field at more modest current can be provided. FIG. 36 graphically illustrates the close-in near field and mid field.

Figure 37:
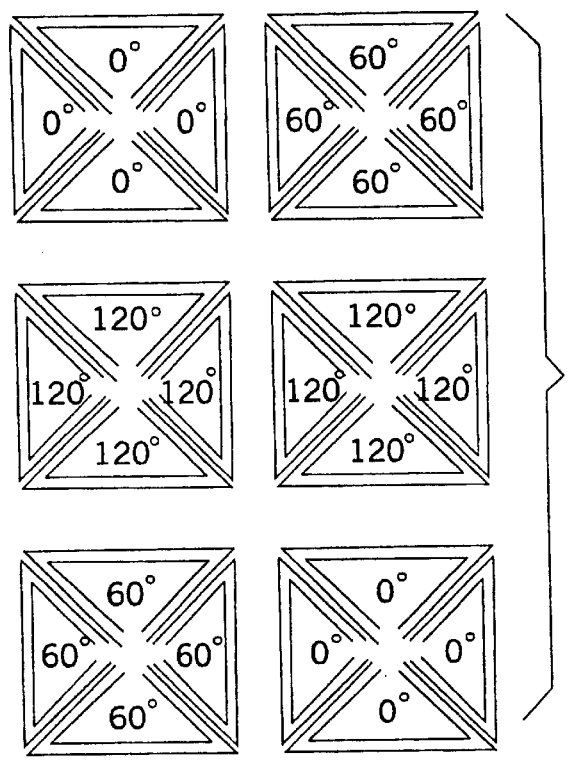
Figure 38:
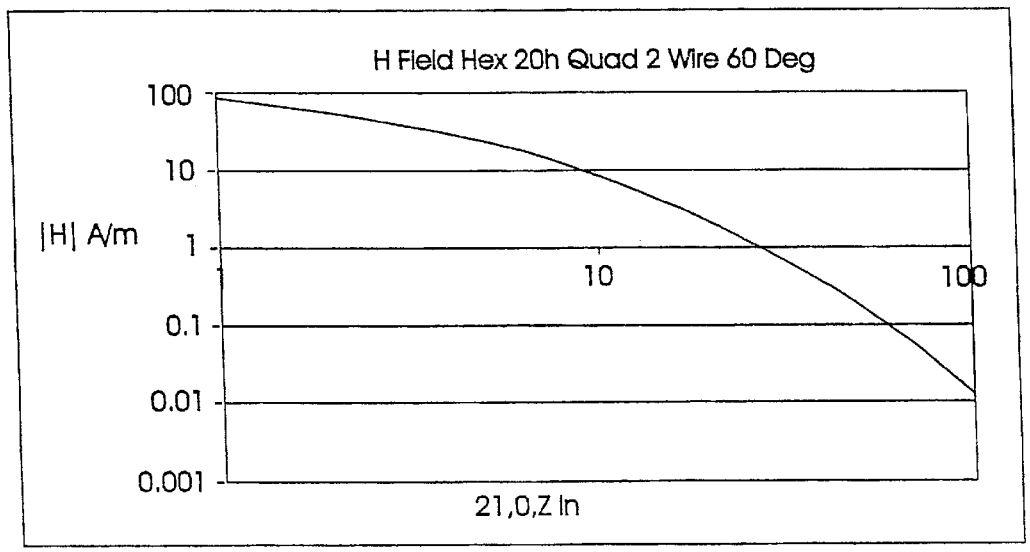

Finally, FIG. 37 illustrates six 20-inch quad wedge spirals at 60° offsets. FIG. 37 differs from FIG. 35 in that each current loop is a two loop spiral current loop. Simulation shows the same mid field as the embodiment of FIG. 35, i.e., 0.0559 A/m, at a reduced current of 9.87382 A. FIG. 38 graphically illustrates the close-in near field and mid field for this configuration. Accordingly, the configuration of FIG. 37 may be most preferred, based on simulations.

In summary, comparing the 20-inch diameter loop of FIG. 18 and the six arrays of 20-inch quad concentric wedges of FIG. 37, an order-of-magnitude more mid field may be produced at 3 meters without violating FCC regulations at 30 meters. This order-of-magnitude increase in mid field can provide wireless powering of microelectronic devices.

Figure 39A:
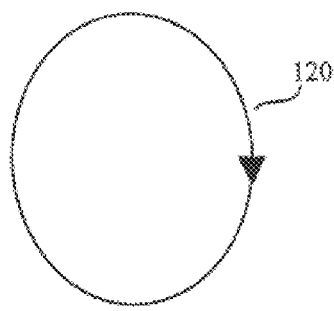
FIG. 39A illustrates a single in-phase current loop according to the parent application.
Figure 39B:
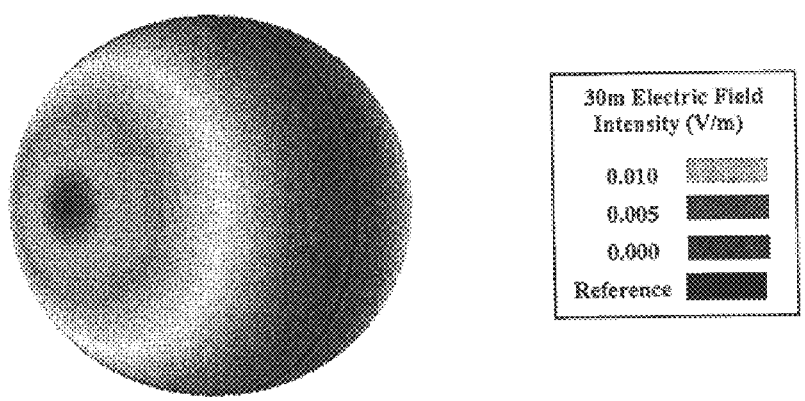
FIGS. 39B–39D graphically illustrate simulations of electric field intensity at 30 meters, electric field azimuth pattern and magnetic field, respectively, for the in-phase current loop of FIG. 39A.
Figure 39C:
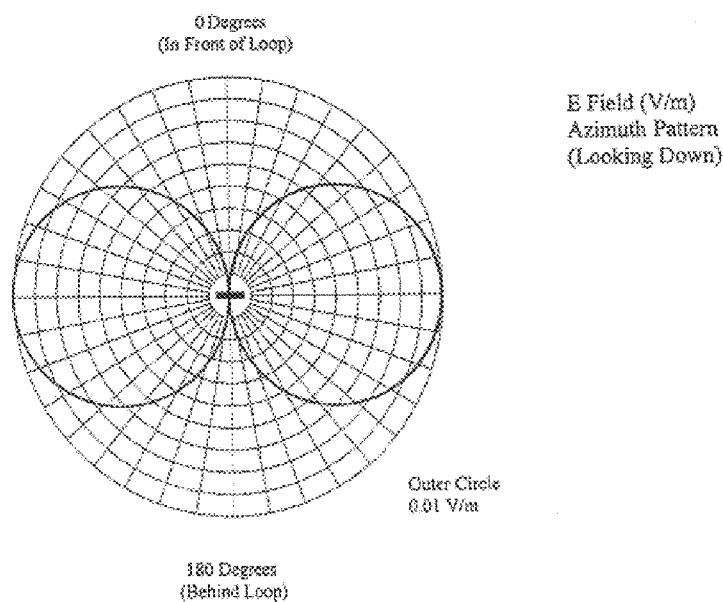

In order to explain the desirability of providing at least two in-phase current loops, arrays of in-phase current loops and/or arrays of arrays of in-phase current loops that are spaced apart from one another and at least partially overlapping in the axial direction, according to the present invention, the radiation patterns of a single virtual loop first will be described. FIG. 39A illustrates a single in-phase current loop 120 that may be produced using any of the systems or methods of the parent application. The peak magnitude of the far field occurs in the plane of the loop and is radially symmetric about it. As shown in FIGS. 39B and 39C, the radiation pattern at 30 meters is relatively independent of the shape and size of the current loop if the phase change of the current around the loop is small. The magnitude of the far and the near field, however, is linear with respect to the loop current and is highly dependent on the size and the shape of the loop.

Figure 39D:
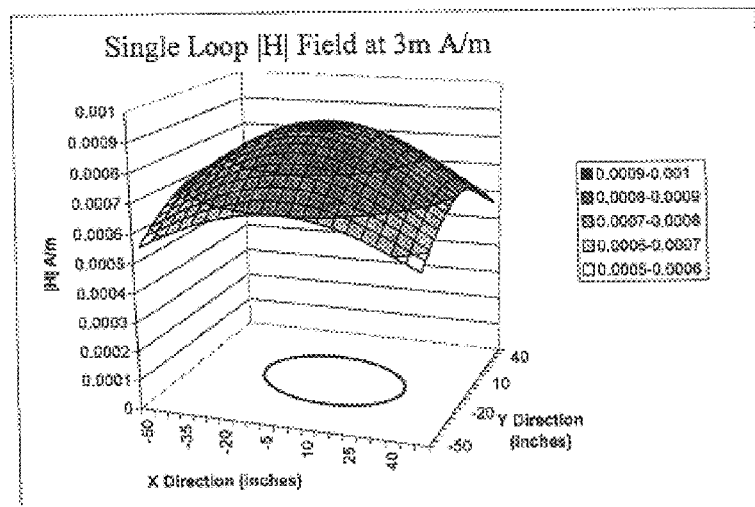

FIG. 39D shows the H (magnetic) field 3 meters from the plane of the current loop 120. As shown, the magnetic near field is greatest axially in front of the loop. The simulation results of FIGS. 39B–D are for a 40 inch square antenna comprised of four adjacent 20-inch squares as was described in the parent application. The current was set so that the far field radiation at 30 meters just passed FCC regulations, which occurs at about 0.1196 A.

Figure 40D:
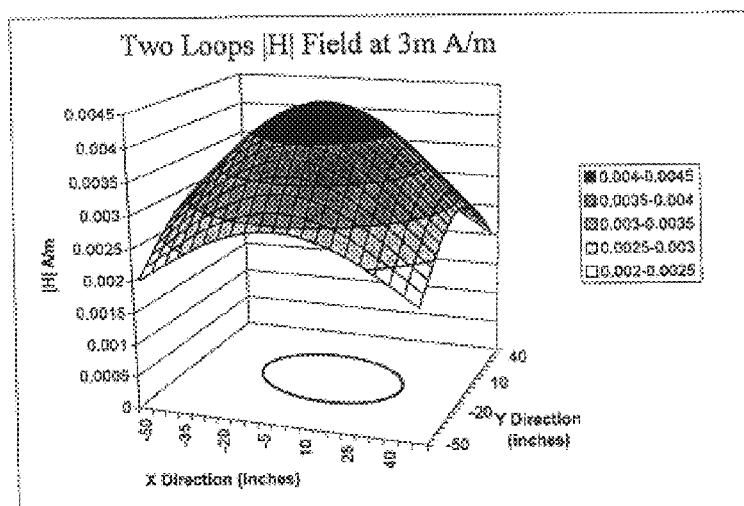
Figure 40A:
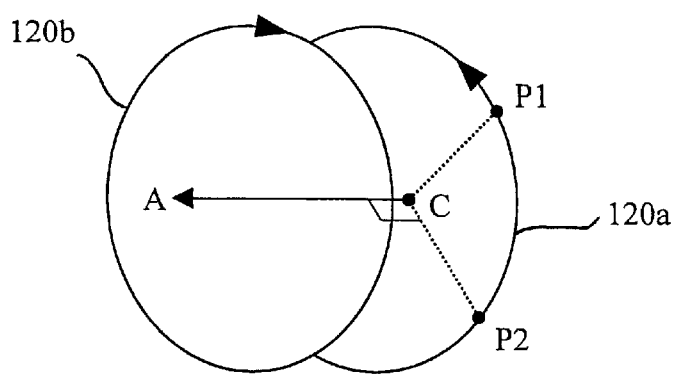
FIG. 40A illustrates two in-phase current loops that are spaced apart from one another to at least partially overlap in the axial direction according to the present invention.

FIG. 40A shows two in-phase current loops 120a and 120b that are spaced apart from one another to at least partially overlap in the axial direction according to the present invention. In FIG. 40A the two current loops 120a and 120b are illustrated as being planar. However, either or both need not be planar. Accordingly, the at least partial overlap between the first current loop 120a and second current loop 120b may be defined by a first surface that is defined by the first current loop 120a, and a center C for the first surface, wherein two points P1 and P2 on the periphery of the first surface and the center C define a plane and an axial direction A that is normal to the plane. The second current loop 120b uses a same second direction current that is opposite the same first direction current of the first virtual current loop 120a, wherein the first surface is spaced apart from and at least partially overlaps the second surface in the axial direction A.

Still referring to FIG. 40A, either or both of the loops 120a and 120b may be formed using any of the systems or methods described in the parent application including an actual current loop, an array of in-phase virtual current loops and/or an array of arrays of in-phase virtual current loops. Radiation at 30 meters due to both current loops 120a and 120b can be considered to be the vector sum of the radiation due to each of the actual or virtual current loops. The case of two current loops placed as in FIG. 40A yields a resultant radiation pattern that is the vector sum of the two opposite electromagnetic fields. The closer two identical and opposite phase current loops are physically placed, the lower the resultant electromagnetic fields, near and far alike. Since the far field radiation is measured at a distance comparable to the wavelength, two current loops separated by relatively short distances appear to be almost coincident at wavelength distances. Indeed, at points equidistant from both loops, i.e. in the plane that splits the loops, much of the far field cancels. At distances from the loops comparable to the separation, the magnitude of the near field is a stronger function of the closer loop. Indeed, from the axis A in front of one of the two loops, the cancelled effect of the more distant loop generally is lowest. Thus, two loops arranged as shown in FIG. 40A can simultaneously create a far field pattern with the two loops effectively canceling where the individual loop radiation is the greatest and, a magnetic near field that can reduce and preferably minimize the canceling effect of the second loop where the individual loop field is at maximum.

Figure 40B:
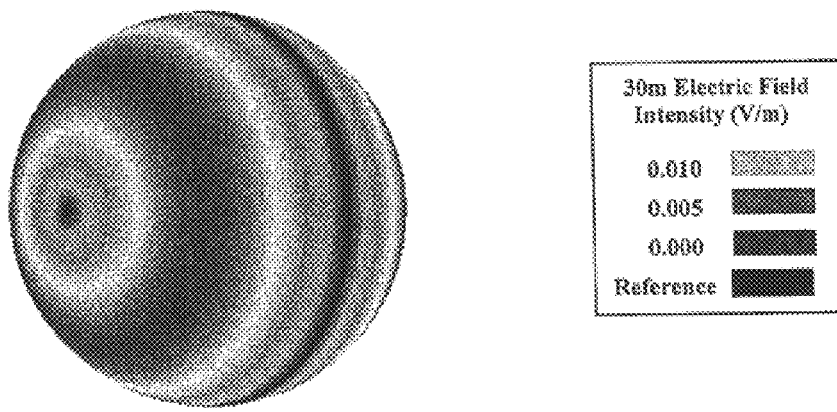
Figure 40C:
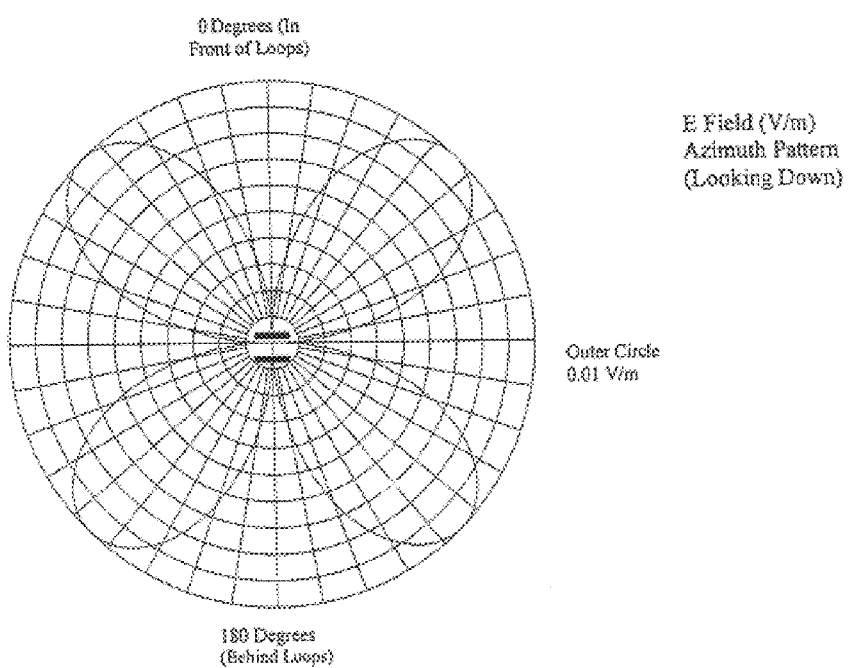

FIGS. 40B, 40C and 40D graphically illustrate simulation results for two identical loops as described in FIG. 40A, separated by twelve inches. Again, the current was set so that the far field radiation at 30 meters just passed FCC regulations at the maximum points. This yields a current of approximately 2.728 A in each loop. The near magnetic field of FIG. 40D was measured at a distance of 3 meters from the plane of the closer loop. This field will be the same on either side since the field is symmetric but opposite in phase from one side to another. As shown, a much stronger magnetic field may be produced at 3 meters compared to a single current loop of FIGS. 39A–39D.

Physically identical current loops 120a and 120b may be used to produce virtual or actual current of the same magnitude but of opposite phase due to symmetry. If the loops are physically identical, then any influence that the current distribution on one loop may have over the other also generally exists in reverse. Moreover, identical drivers may be used with both loops or a single driver may be used to drive the loops together. In the latter case, the 180° phase difference between the loops may be accomplished by wiring the loops in parallel, but with the wires reversed on one of the loops, as was described in the parent application.

The spacing of the loops 120a and 120b may affect the magnitude of the resultant radiation. As the loops are moved closer together, they can cancel better. Accordingly, in order to keep the far field radiation at a particular value, for example, just below FCC guidelines, the current in each of the virtual current loops 120a and 120b may need to be increased. It might be assumed that these larger currents would also increase the composite near magnetic field in front of the loops. However, the closer spacing also can cancel the near field more efficiently as well. There may be a slight gain, particularly at axial distances comparable to the spacing between the loops, but the problems associated with much higher currents may offset this advantage.

Since the radiation pattern of a loop at 30 meters is relatively independent of the size and shape of the loop, the current loops 120a and 120b need not be physically identical to have similar performance. The in-phase current loops of the parent application can provide for a relatively uniform "disc" of far field radiation in the plane of the current loop. The magnitude of the pattern can be adjusted by changing the magnitude of the current. Thus, one may view the loop placed behind the closer loop as a "far field canceling loop." Depending on the spacing, the near field may be canceled less, thereby providing improved wireless power projection without violating far field regulations. The higher the ratio of far to near field radiation due to the canceling loop, the more the current in the closer loop can be increased, which can provide higher overall near field strengths. Similarly, the lower the ratio of far to near field radiation due to the closer loop, the better may be the performance. Physical parameters including but not limited to loop shape, loop size, wire diameter and/or dielectric around the wires may be used to optimize these ratios. One possible drawback to nonidentical loops is the potential need for different currents in the loops. Thus, the currents may need to be adjusted for proper balance.

Figure 41:
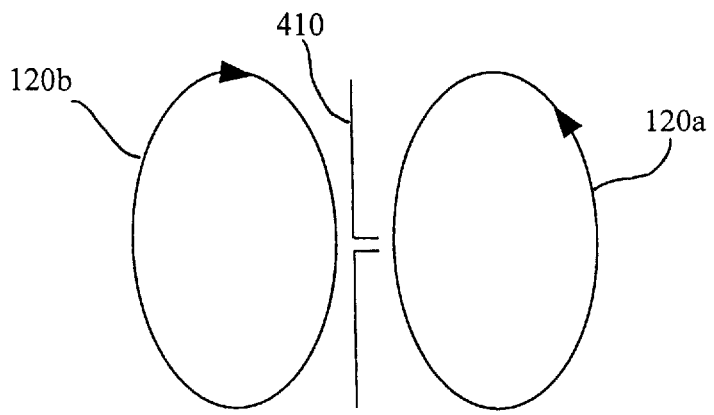
FIG. 41 illustrates a receive antenna between overlapping portions of first and second current loops according to the present invention.

FIG. 41 illustrates other embodiments of the present invention wherein a receive antenna 410 is placed between overlapping portions of the first and second surfaces of the first and second current loops 120a and 120b, preferably midway between the overlapping portions of the first and second surfaces and more preferably parallel to the overlapping portion of the first and/or second surfaces. By placing the loops 120a and 120b in spaced apart at least partially axially overlapping relationship, improved placement of the receive antenna may be obtained.

More particularly, commands and power may be sent to tags via a primary carrier frequency. Tags can respond with their data, which is received and processed by the reader. Generally, a tag's return signal is extremely weak and may be overwhelmed by the large electromagnetic fields that exist near the reader, thus making discrimination difficult or even impossible. Solutions to this problem include physically separating the transmit and receive antennas and circuitry and/or completely powering down the transmitter when tag data is expected to return. Unfortunately, physically separating the transmit and receive antennas and circuitry may need a larger, less versatile reader and may not necessarily alleviate the problem. Moreover, completely powering down the transmitter when tag data is expected may require a more complex tag design that can operate without power and synchronization.

In sharp contrast, the present invention that uses two spaced apart, opposite phase, axially overlapping current loops 120a and 120b can provide a surface between the loops that can have no magnetic flux crossing it. For two identical planar current loops with equal and opposite currents as shown in FIG. 41, this surface is a plane midway between the two. A receive loop antenna 410 that is placed on this plane will have very little of the carrier frequency imparted upon it from the current loops 120a and 120b. Hence, a relatively large loop or loops may be employed as the reader receive antenna without the need to filter an excessive component of the carrier frequency. Moreover, an extremely sensitive circuit can be designed utilizing a low noise amplifier with far less concern about carrier frequency saturation. In addition, multiple separate receive loops on the surface may be used to increase sensitivity and/or reliability and/or to ascertain the direction of the tag moving with respect to the reader or a reader moving with respect to a tag or series of tags.

FIGS. 42A–42D illustrate other embodiments of the invention wherein three current loops 120a–120c are spaced apart and at least partially overlap in the axial direction. As was the case for two loops, the loops may be identical and may totally overlap. As was the case for FIG. 40A, the loops may be formed using any of the techniques of the parent application, including an actual current loop, an array of in-phase current loops and/or arrays of arrays of in-phase current loops.

Figure 42D:
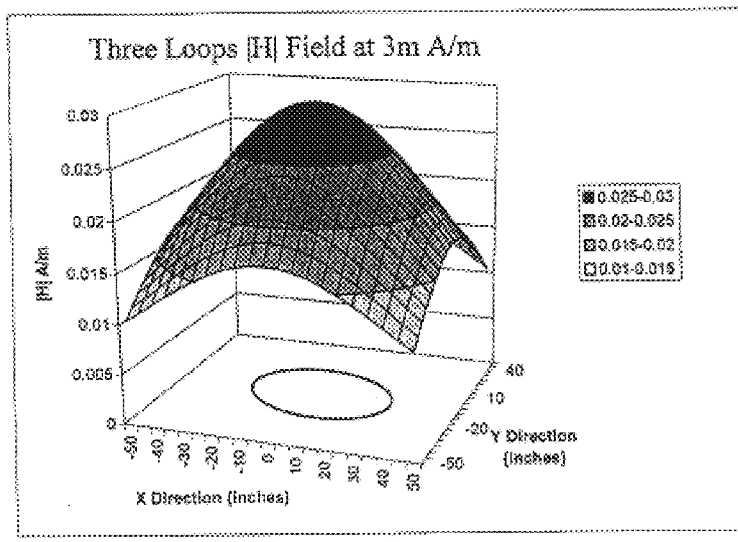
FIGS. 42B–42D graphically illustrate simulations of electric field intensity at 30 meters, electric field azimuth pattern and magnetic field, respectively, for the three current loops of FIG. 42A.
Figure 42A:
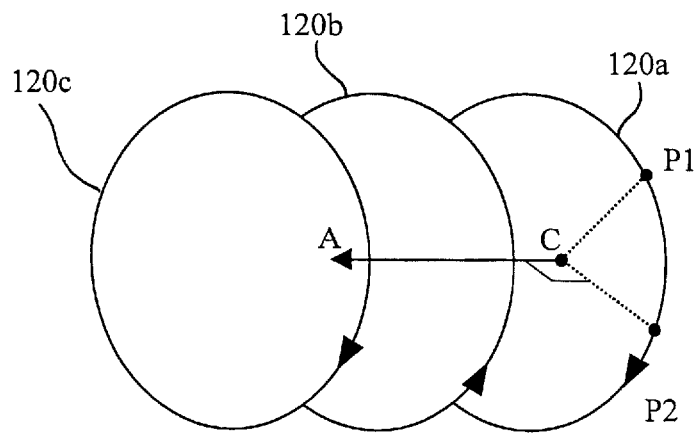
FIG. 42A illustrates three spaced apart at least partially axially overlapping current loops according to the present invention.
Figure 42B:
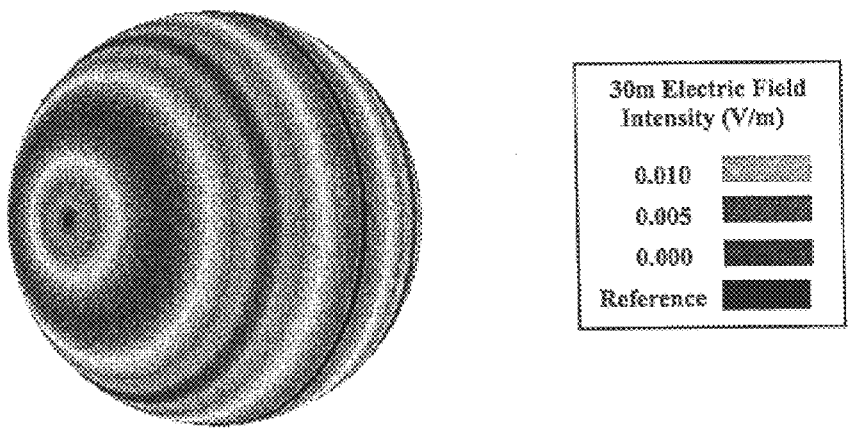
Figure 42C:
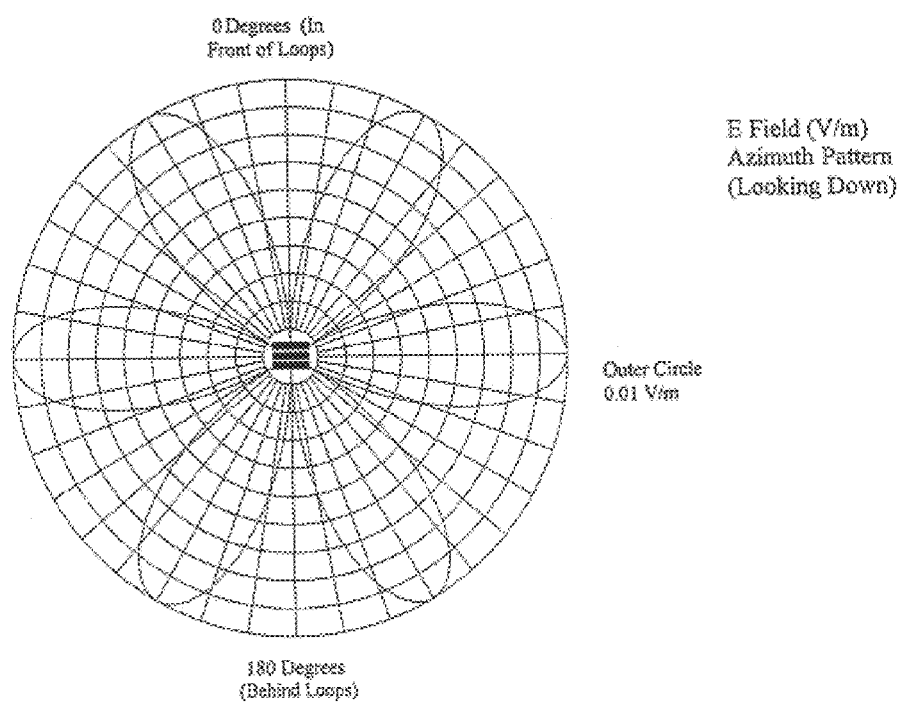

In the simulations of FIGS. 42B–42D, each of the three virtual current loops 120a–120c is formed by four adjacent 20 inch squares. Spacing between the loops was set at 12 inches. The middle loop 120b is used as the canceling loop, carries approximately twice the current as the other two loops 120*a* and 120*c,* and is 180° out-of-phase with respect to the other two loops 120*a* and 120*c*. The currents were set so that the FCC regulation of 0.01 V/m was not violated anywhere on the 30 meter sphere surrounding the loop. These currents are 128.3 A in the middle loop 120*b* and 64.22 A in the other two loops 120*a* and 120*c*. See FIGS. 42B and 42C.

In FIG. 42D, a near magnetic field plot is shown at a distance of 3 m from the plane of the closest loop. As shown, even larger magnetic fields than were available with two loop designs of FIG. 41, may be available.

Since the field is symmetric and in phase from both sides, this near magnetic field plot applies to either sides of the loops. Since all the configurations described produce two equally viable near fields, one such unit may be placed between two doorways to simultaneously cover both. Note that, as was the case for the two loops of FIG. 40A, all the loops 120*a,* 120*b* and 120*c* may have different physical parameters to optimize the near field. If a particular application is such that the near magnetic field that is desired is only half that supplied by one of the described configurations, then the currents may be reduced by a factor of 2. This would also reduce the maximum far field radiation on the 30 meter sphere by a factor of 2. The relatively large currents that are shown to generate the fields of the triple loop of FIG. 42A can be reduced using the techniques described in the parent application. It also will be understood that four or more alternating phase, spaced apart and axially overlapping loops also may be provided.

The near magnetic field strength of 3 meters greatly increases as one progresses from one loop to two loops to three as shown in FIGS. 39D, 40D and 42D, but much less than the generating currents increase. This phenomenon appears to indicate that by canceling the far field, much of the near field also is canceled. However, by controlling the uniformity and directionality of the field generation, one can cancel the near field less than the far field. The hot spots, actually hot "rings," created with three loops cover more area on the 30 meter sphere of FIG. 42B than do the spots created with the two loop structure of FIG. 40B. This suggests that by creating a more spherically uniform radiation pattern the near field may be increased even further. By varying the phasing in, and/or by tilting multiple loops with respect to one another, the desired effect may be achieved. However, it may be difficult to control the magnitude and phase of even a few loops in this manner.

Another approach may involve placing the similar phase virtual current generators in a spiral pattern on a complex three dimensional, nonplanar surface. Thus, as was shown in the parent application, the spokes or feed lines of these virtual current structures need not be in the same plane as the loop itself. Moreover, the virtual current loops need not be planar. For example, a pair of zigzag edged loops may produce a more distributed band of far field radiation than a pair of straight edges. This may allow an increase in current such that the near field may be stronger. In all of these configurations, there preferably exists a surface between the virtual current loops that has no net flux at the carrier frequency. The receive antenna or antennas preferably are placed on this surface.

As was described in the parent application, a tag's orientation with respect to the magnetic flux lines may be an important factor for proper operation. For a flat tag, only those flux lines that are perpendicular to the tag surface generally contribute to the tag's power supply. In the parent application, different embodiments were described to increase the likelihood that a moving or stationary tag would receive enough flux to operate properly. According to the present invention, two or more sets of spaced apart, axially overlapping loops may be used, with different axial orientations, to enhance the likelihood that a tag will receive enough magnetic flux lines notwithstanding the tag's orientation.

Figure 43:
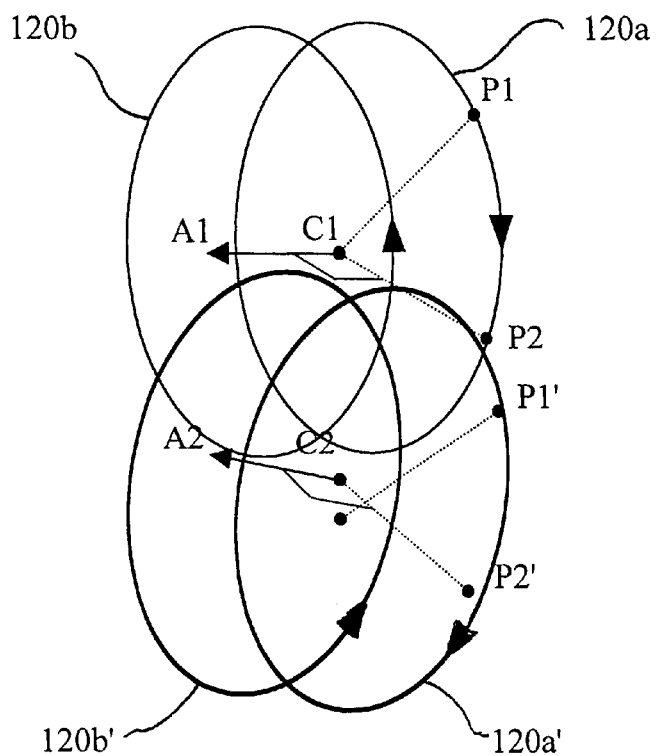
FIG. 43 illustrates first and second sets of spaced apart axially overlapping current loops having different axial orientations according to the present invention.

Thus, in FIG. 43, a first set of spaced apart current loops 120*a* and 120*b* that at least partially axially overlap, and a second set of spaced apart current loops 120*a'* and 120*b'* that at least partially axially overlap are provided. The first and second sets of current loops have different axial orientations as shown by the different axes A1 and A2 that are defined by the respective points C1, P1 and P2 and C2, P1' and P2'.

With one set of loops, potential null spots may exist. For example, FIGS. 39A, 40A and 42A all have a null spot, generally along the axis A, when flat tags are presented perpendicular to the plane of the transmitting antennas. With two complete sets of loops mounted together but at a slight angle with respect to each other, as shown in FIG. 43, all spots may be covered as each set can cover the other set's nulls.

The two sets of loops preferably are not powered at the same instant because this may create multiple 30 meter far field variations. However, by alternating operation between the two sets, a large coverage volume without nulls may be provided. The same effect may be obtained by physically turning one set of loops.

In order to efficiently cover a larger area with two sets of loops, one set may be oriented slightly to the left and upward while the other set may be oriented slightly to the right and downward. This can provide minimal or no overlapping of the nulls of the two sets.

Figure 44:
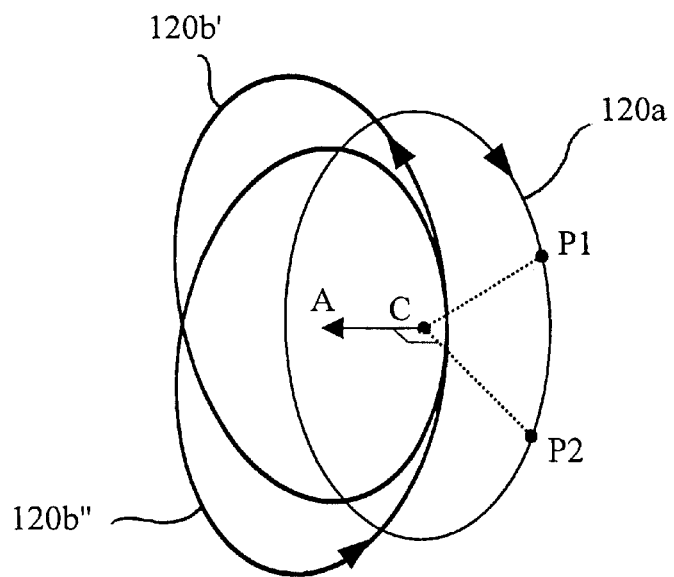
FIG. 44 illustrates a first current loop and a pair of second current loops that are spaced apart from and axially overlap the first current loop according to the present invention.

Referring now to FIG. 44, another embodiment replicates the second loop. Thus, a first virtual current loop 120*a* and at least two second current loops 120*b'* and 120*b"* are provided, each of which is spaced apart from the first current loop 120*a* and each of which at least partially laterally overlaps the first virtual current loop 120*a* while being axially offset from each other. Thus, each of the two outer loops 120*b'* and 120*b"* is skewed with respect to each other and preferably is also slightly skewed with respect to the first or canceling loop 120*a*. This may move and increase the magnitude of the far field radiation so that the overall current may need to be reduced slightly to compensate.

In the drawings and specification, there have been disclosed typical preferred embodiments of the invention and, although specific terms are employed, they are used in a generic and descriptive sense only and not for purposes of limitation, the scope of the invention being set forth in the following claim.

What is claimed is:

1. A system for wirelessly projecting power to wirelessly power microelectronic devices, the system comprising:

a first array of in-phase current loops that are disposed adjacent to one another to define a first surface and to define a first virtual current loop at a periphery of the first surface that produces a same first direction virtual current while current in adjacent portions of adjacent current loops flows in opposite directions, the first surface including a center, wherein two points on the periphery of the first surface and the center define a plane and an axial direction that is normal to the plane; and a second array of in-phase current loops that are disposed adjacent to one another to define a second surface and to define a second virtual current loop at a periphery of the second surface that produces a same second direction virtual current that is opposite the same first direction virtual current while current in adjacent portions of adjacent current loops flows in opposite directions, wherein the first surface is spaced apart from and at least partially overlaps the second surface in the axial direction.

2. The system according to claim 1 wherein at least one of the first and second arrays of in-phase current loops comprises an array of at least two wedge-shaped current loops, each having an outer portion and a pair of sides, the at least two wedge-shaped current loops being disposed adjacent to one another to define a surface such that currents in the outer portions are in-phase and current in adjacent sides of adjacent current loops are out-of-phase.

3. The system according to claim 1 wherein at least one of the first and second arrays of in-phase current loops comprises an array of at least two polygonal current loops, each having a plurality of sides, the at least two polygonal current loops being disposed adjacent to one another to define a surface, such that currents in the sides of the at least two polygonal loops that are adjacent the periphery of the surface are in-phase and current in adjacent sides of adjacent current loops are out-of-phase.

4. The system according to claim 1 wherein at least one of the first and second arrays of in-phase current loops comprises an array of spiral current loops.

5. The system according to claim 1 wherein each of the in-phase current loops is less than a quarter wavelength long.

6. The system according to claim 1 wherein at least one of the first and second arrays of in-phase current loops comprises an array of concentric current loops.

7. The system according to claim 1 wherein least one of the first and second arrays of in-phase current loops comprises an array of stacked current loops.

8. The system according to claim 1 further comprising a driver that drives the first and second arrays of current loops at 13.56 MHz to thereby wirelessly project power.

9. The system according to claim 1 wherein the first and second arrays of in-phase current loops are arranged to provide at least some reinforcement of an electromagnetic near field that is produced by the current loops while producing at least some cancellation of a far field electromagnetic wave that is produced by the current loops.

10. The system according to claim 1 wherein the first and second arrays of in-phase current loops are of same size.

11. The system according to claim 1 wherein the first surface is spaced apart from and completely overlaps the second surface in the axial direction.

12. The system according to claim 10 wherein the first surface is spaced apart from and completely overlaps the second surface in the axial direction.

13. The system according to claim 1 further comprising a receive antenna between overlapping portions of the first and second surfaces.

14. The system according to claim 13 wherein the receive antenna is midway between the overlapping portions of the first and second surfaces.

15. The system according to claim 14 wherein the receive antenna extends parallel to the overlapping portion of the first surface.

16. The system according to claim 1 further comprising:
a third array of in-phase current loops that are disposed adjacent to one another to define a third surface and to define a third virtual current loop at a periphery of the third surface that produces a same first direction virtual current while current in adjacent portions of adjacent current loops flows in opposite directions, wherein the third surface is spaced apart from the second surface, is opposite the first surface and at least partially overlaps the second surface in the axial direction.

17. The system according to claim 1 wherein the plane is a first plane and wherein the axial direction is a first axial direction, the system further comprising:
a third array of in-phase current loops that are disposed adjacent to one another to define a third surface and to define a third virtual current loop at a periphery of the third surface that produces a same first direction virtual current while current in adjacent portions of adjacent current loops flows in opposite directions, the third surface including a center, wherein two points on the periphery of the third surface and the center define a second plane and a second axial direction that is normal to the second plane and that is different from the first axial direction; and
a fourth array of in-phase current loops that are disposed adjacent to one another to define a fourth surface and to define a fourth virtual current loop at a periphery of the fourth surface that produces a same second direction virtual current that is opposite the same first direction virtual current while current in adjacent portions of adjacent current loops flows in opposite directions, wherein the fourth surface is spaced apart from and at least partially overlaps the third surface in the second axial direction.

18. A system for wirelessly projecting power to wirelessly power microelectronic devices, the system comprising:
a plurality of first arrays of in-phase current loops, the first arrays of in-phase current loops being disposed adjacent to one another to define a first surface, each first array of in-phase current loops defining a virtual current such that virtual currents of at least some adjacent first arrays of in-phase current loops are not in-phase with one another, each first array of in-phase current loops comprising a plurality of in-phase current loops that are disposed adjacent to one another in the first surface, such that current in adjacent portions of adjacent current loops in a first array flows in opposite directions, the first surface including a center, wherein two points on the periphery of the first surface and the center define a plane and an axial direction that is normal to the plane; and
a plurality of second arrays of in-phase current loops, the second arrays of in-phase current loops being disposed adjacent to one another to define a second surface, each second array of in-phase current loops defining a virtual current such that virtual currents of at least some adjacent second arrays of in-phase current loops are not in-phase with one another, each second array of in-phase current loops comprising a plurality of in-phase current loops that are disposed adjacent to one another in the second surface, such that current in adjacent portions of adjacent current loops in a second array flows in opposite directions, wherein the first surface is spaced apart from and at least partially overlaps the second surface in the axial direction.

19. The system according to claim 18 wherein the virtual currents of adjacent arrays of in-phase current loops are of opposite phase from one another.

20. The system according to claim 18 wherein the plurality of first and second arrays of in-phase current loops each comprises four arrays of current loops that are arranged in two rows and two columns, such that the virtual currents in the arrays in each row and each column are of opposite phase.

21. The system according to claim 18 wherein the plurality of first and second arrays of in-phase current loops each comprises four arrays of current loops that are arranged in two rows and two columns, such that the virtual currents in the arrays in each row and each column are 90° out-of-phase from one another.

22. The system according to claim 20 wherein the two rows and two columns are two oblique rows and two oblique columns.

23. The system according to claim 21 wherein the two rows and two columns are two oblique rows and two oblique columns.

24. The system according to claim 18 wherein the plurality of first and second arrays of in-phase current loops each comprises a plurality of arrays of current loops that are arranged in a circle, such that the virtual currents in adjacent arrays in the circle are of opposite phase.

25. The system according to claim 18 wherein each array of in-phase loops is arranged to provide at least some reinforcement of an electromagnetic near field that is produced by the current loops in an array while producing at least some cancellation of a far field electromagnetic wave that is produced by the current loops in the array.

26. The system according to claim 25 wherein the plurality of arrays of in-phase current loops are arranged provide at least some further reinforcement of the electromagnetic near fields that are produced by the arrays of in-phase current loops and at least some further cancellation of the far field electromagnetic waves that are produced by the arrays of in-phase current loops.

27. The system according to claim 18 wherein at least one of the plurality of first and second arrays of in-phase current loops comprises an array of at least two wedge-shaped current loops, each having an outer portion and a pair of sides, the at least two wedge-shaped current loops being disposed adjacent to one another to define a surface such that currents in the outer portions are in-phase and current in adjacent sides of adjacent current loops are out-of-phase.

28. The system according to claim 18 wherein at least one of the plurality of first and second arrays of in-phase current loops comprises an array of at least two polygonal current loops, each having a plurality of sides, the at least two polygonal current loops being disposed adjacent to one another to define a surface, such that currents in the sides of the at least two polygonal loops that are adjacent the periphery of the surface are in-phase and current in adjacent sides of adjacent current loops are out-of-phase.

29. The system according to claim 18 wherein at least one of the plurality of first and second arrays of in-phase current loops comprises an array of spiral current loops.

30. The system according to claim 18 wherein each of the in-phase current loops is less than a quarter wavelength long.

31. The system according to claim 18 wherein at least one of the plurality of first and second arrays of in-phase current loops comprises an array of concentric current loops.

32. The system according to claim 18 wherein least one of the plurality of first and second arrays of in-phase current loops comprises an array of stacked current loops.

33. The system according to claim 18 further comprising a driver that drives the plurality of first and second arrays of current loops at 13.56 MHz to thereby wirelessly project power.

34. The system according to claim 18 wherein the plurality of first and second arrays of in-phase current loops is arranged to provide at least some reinforcement of an electromagnetic near field that is produced by the current loops while producing at least some cancellation of a far field electromagnetic wave that is produced by the current loops.

35. The system according to claim 18 wherein the plurality of first and second arrays of in-phase current loops are of same size.

36. The system according to claim 18 wherein the first surface is spaced apart from and completely overlaps the second surface in the axial direction.

37. The system according to claim 35 wherein the first surface is spaced apart from and completely overlaps the second surface in the axial direction.

38. The system according to claim 18 further comprising a receive antenna between overlapping portions of the first and second surfaces.

39. The system according to claim 38 wherein the receive antenna is midway between the overlapping portions of the first and second surfaces.

40. The system according to claim 39 wherein the receive antenna extends parallel to the overlapping portion of the first surface.

41. The system according to claim 18 further comprising:
a plurality of third arrays of in-phase current loops, the third arrays of in-phase current loops being disposed adjacent to one another to define a third surface, each third array of in-phase current loops defining a virtual current such that virtual currents of at least some adjacent third arrays of in-phase current loops are not in-phase with one another, each third array of in-phase current loops comprising a plurality of in-phase current loops that are disposed adjacent to one another in the third surface, such that current in adjacent portions of adjacent current loops in a third array flows in opposite directions, wherein the third surface is spaced apart from the second surface, is opposite the first surface and at least partially overlaps the second surface in the axial direction.

42. The system according to claim 18 wherein the plane is a first plane and wherein the axial direction is a first axial direction, the system further comprising:
a plurality of third arrays of in-phase current loops, the third arrays of in-phase current loops being disposed adjacent to one another to define a third surface, each third array of in-phase current loops defining a virtual current such that virtual currents of at least some adjacent third arrays of in-phase current loops are not in-phase with one another, each third array of in-phase current loops comprising a plurality of in-phase current loops that are disposed adjacent to one another in the third surface, such that current in adjacent portions of adjacent current loops in a third array flows in opposite directions, the third surface including a center, wherein two points on the periphery of the third surface and the center define a second plane and a second axial direction that is normal to the second plane and that is different from the first axial direction; and
a plurality of fourth arrays of in-phase current loops, the fourth arrays of in-phase current loops being disposed adjacent to one another to define a fourth surface, each fourth array of in-phase current loops defining a virtual current such that virtual currents of at least some adjacent fourth arrays of in-phase current loops are not in-phase with one another, each fourth array of in-phase current loops comprising a plurality of in-phase current loops that are disposed adjacent to one another in the fourth surface, such that current in adjacent portions of adjacent current loops in a fourth array flows in opposite directions, wherein the third surface is spaced apart from and at least partially overlaps the fourth surface in the second axial direction.

43. A method for wirelessly projecting power to wirelessly power microelectronic devices, the method comprising the steps of:

applying current to a first array of in-phase current loops that are disposed adjacent to one another to define a first surface and to define a first virtual current loop at a periphery of the first surface that produces a same first direction virtual current while current in adjacent portions of adjacent current loops flows in opposite directions, the first surface including a center, wherein two points on the periphery of the first surface and the center define a plane and an axial direction that is normal to the plane; and applying current to a second array of in-phase current loops that are disposed adjacent to one another to define a second surface and to define a second virtual current loop at a periphery of the second surface that produces a same second direction virtual current that is opposite the same first direction virtual current while current in adjacent portions of adjacent current loops flows in opposite directions, wherein the first surface is spaced apart from and at least partially overlaps the second surface in the axial direction.

44. A method for wirelessly projecting power to wirelessly power microelectronic devices, the method comprising the steps of:

applying current to a plurality of first arrays of in-phase current loops, the first arrays of in-phase current loops being disposed adjacent to one another to define a first surface, each first array of in-phase current loops defining a virtual current such that virtual currents of at least some adjacent first arrays of in-phase current loops are not in-phase with one another, each first array of in-phase current loops comprising a plurality of in-phase current loops that are disposed adjacent to one another in the first surface, such that current in adjacent portions of adjacent current loops in a first array flows in opposite directions, the first surface including a center, wherein two points on the periphery of the first surface and the center define a plane and an axial direction that is normal to the plane; and applying current to a plurality of second arrays of in-phase current loops, the second arrays of in-phase current loops being disposed adjacent to one another to define a second surface, each second array of in-phase current loops defining a virtual current such that virtual currents of at least some adjacent second arrays of in-phase current loops are not in-phase with one another, each second array of in-phase current loops comprising a plurality of in-phase current loops that are disposed adjacent to one another in the second surface, such that current in adjacent portions of adjacent current loops in a second array flows in opposite directions, wherein the first surface is spaced apart from and at least partially overlaps the second surface in the axial direction.

* * * * *